(12) United States Patent
Song

(10) Patent No.: US 11,390,773 B2
(45) Date of Patent: *Jul. 19, 2022

(54) THERMOPLASTIC COATING FORMULATIONS FOR HIGH-VELOCITY SPRAYER APPLICATION AND METHODS FOR APPLYING SAME

(71) Applicant: THE BOEING COMPANY, Chicago, IL (US)

(72) Inventor: Weidong Song, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,810

(22) Filed: Jan. 19, 2021

(65) Prior Publication Data
US 2021/0139736 A1 May 13, 2021

Related U.S. Application Data

(62) Division of application No. 16/051,914, filed on Aug. 1, 2018, now abandoned.

(51) Int. Cl.
| | | |
|---|---|---|
| C09D 161/16 | (2006.01) | |
| C23C 4/04 | (2006.01) | |
| B05B 15/00 | (2018.01) | |
| B05D 1/02 | (2006.01) | |
| B05C 5/00 | (2006.01) | |
| C08K 3/08 | (2006.01) | |

(52) U.S. Cl.
CPC ............ *C09D 161/16* (2013.01); *B05B 15/00* (2013.01); *B05C 5/001* (2013.01); *B05C 5/002* (2013.01); *B05D 1/02* (2013.01); *C23C 4/04* (2013.01); *C08K 3/08* (2013.01); *C08K 2003/0881* (2013.01)

(58) Field of Classification Search
CPC .................................... B05D 1/02; C23C 4/04
See application file for complete search history.

(56) References Cited

U.S. PATENT DOCUMENTS

| | | | |
|---|---|---|---|
| 3,755,713 A | | 8/1973 | Paszkowski |
| 5,302,414 A | * | 4/1994 | Alkhimov ............. B05B 7/1486 427/195 |
| 8,293,378 B2 | * | 10/2012 | Owen ..................... C23F 13/06 428/685 |
| 8,658,256 B2 | | 2/2014 | Shokri et al. |
| 2002/0168466 A1 | * | 11/2002 | Tapphorn ................ B05B 7/226 427/454 |
| 2005/0048218 A1 | | 3/2005 | Weidman |

(Continued)

FOREIGN PATENT DOCUMENTS

| | | |
|---|---|---|
| CN | 1410475 A | 4/2003 |
| CN | 101115791 A | 1/2008 |

(Continued)

*Primary Examiner* — Nathan T Leong
(74) *Attorney, Agent, or Firm* — Coats & Bennett, PLLC

(57) ABSTRACT

Tunable thermoplastic polymer powder feedstock formulations and tunable conductive thermoplastic polymer powder feedstock formulations are disclosed for delivery to a high-velocity sprayer are presently disclosed, along with tunable coatings made from the disclosed formulations, and methods for delivering such tunable thermoplastic polymer coatings to substrates.

9 Claims, 11 Drawing Sheets

(56) References Cited

U.S. PATENT DOCUMENTS

Figure 1:
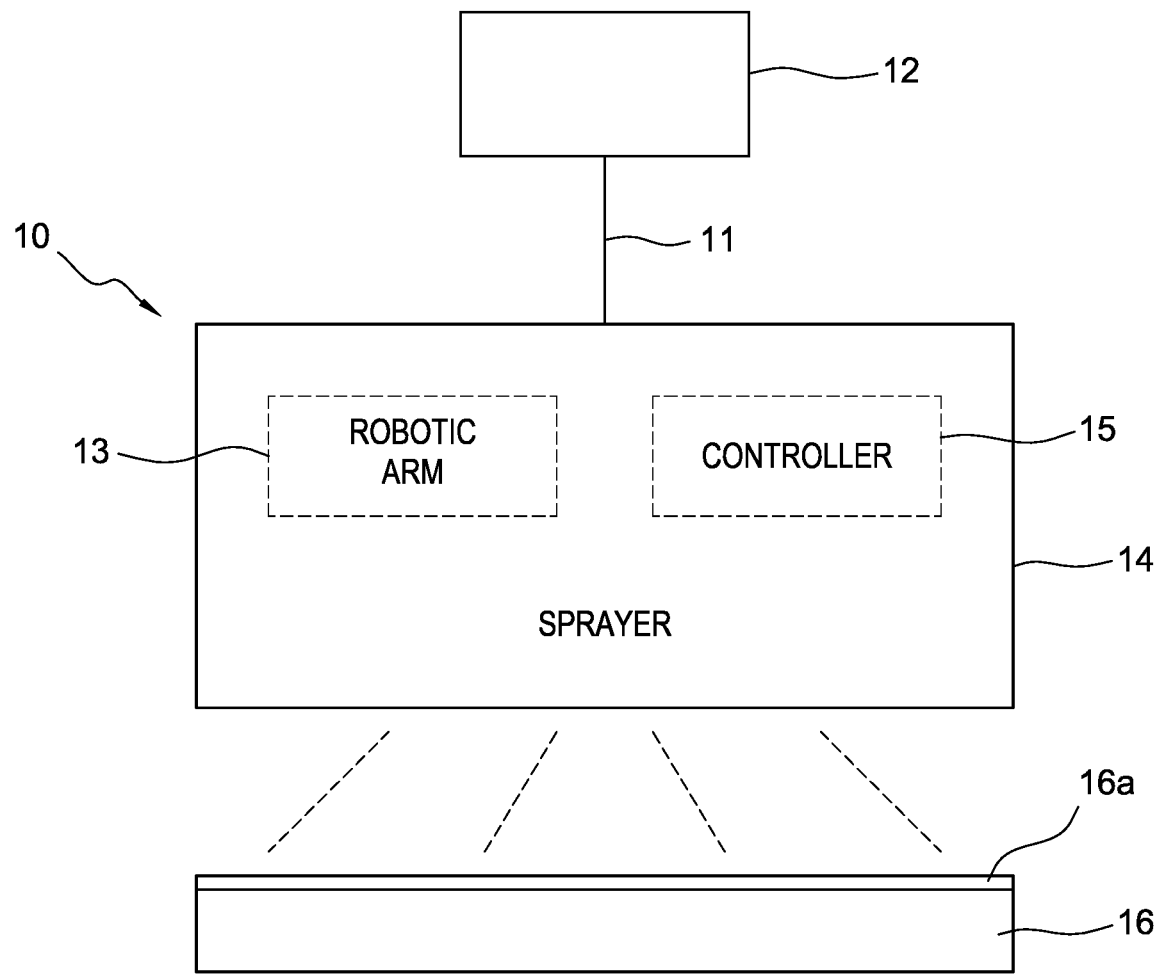

| | | |
|---|---|---|
| 2005/0196543 A1 | 9/2005 | Morton |
| 2006/0183841 A1 | 8/2006 | Aneja et al. |
| 2007/0044406 A1 | 3/2007 | Van Aken et al. |
| 2010/0224724 A1 | 9/2010 | Kamino et al. |
| 2014/0055906 A1 | 2/2014 | Whitlock et al. |
| 2014/0370203 A1 | 12/2014 | Sailer et al. |
| 2015/0210039 A1 | 7/2015 | Simmons et al. |
| 2016/0096302 A1 | 4/2016 | Drexler et al. |
| 2016/0107739 A1 | 4/2016 | Restuccia et al. |
| 2017/0152601 A1 | 6/2017 | Cavaille et al. |
| 2018/0298154 A1 | 10/2018 | Lundorf et al. |

FOREIGN PATENT DOCUMENTS

| | | |
|---|---|---|
| CN | 101309758 A | 11/2008 |
| CN | 103194142 A | 7/2013 |
| CN | 107674559 A | 2/2018 |
| EP | 0988898 A2 | 3/2000 |
| EP | 2733231 A1 | 5/2014 |
| EP | 2585372 B1 | 4/2016 |
| EP | 3150502 A1 | 4/2017 |
| WO | 2006076341 A2 | 7/2006 |
| WO | 2008048705 A2 | 4/2008 |
| WO | 2015023353 A1 | 2/2015 |
| WO | 2015119123 A1 | 8/2015 |
| WO | 2016078664 A1 | 5/2016 |
| WO | 2018110488 A1 | 6/2018 |

\* cited by examiner

THERMOPLASTIC COATING FORMULATIONS FOR HIGH-VELOCITY SPRAYER APPLICATION AND METHODS FOR APPLYING SAME

RELATED APPLICATION

This application is a Division application of U.S. Ser. No. 16/051,914 filed Aug. 1, 2018, the entire contents of which are incorporated by reference herein.

TECHNOLOGICAL FIELD

The present disclosure relates generally to the field of coatings and sealants. More specifically the present disclosure relates to the field of coatings and sealants, including conductive coatings and sealants, particularly those coatings and sealants applied to a surface by thermal spraying.

BACKGROUND

In many fields, components on large structures, including those found on vehicles, including aircraft, etc., are typically coated with paints, primers, coatings, etc. that can provide a number of important functions to a substrate surface, including, for example, protection from corrosion and other forms of environmental degradation, overcoat or sealant adhesion, abrasion resistance, appearance, etc. Coating and sealants are often applied to areas of assembled components or sub-assemblies that are difficult to access through traditional coating and sealant application processes. Further, many coatings and sealants require lengthy curing protocols, or require applying heat or other added triggering mechanism (e.g. ultraviolet radiation, etc.) to obtain an appropriate degree of curing.

Further, some coatings (e.g. paints and primers, etc.) and sealants are often electrically insulative and can result in an impediment to the dissipation of static and other electrical charges. However, certain structures require the need to dissipate electrical charges that build up on a structure's interior and/or exterior surfaces, including static electrical charges, and charges resulting from, for example lightning strikes, etc. The need for electrical charge dissipation is increasingly important in the aircraft industry, as aircraft manufacture continues to incorporate non-metallic materials. Further, in certain aircraft assemblies, non-metallic materials, such as composites, plastics, etc., that do not dissipate electrical charges predictably across their surfaces may be joined with, or otherwise contact, assemblies and sub-assemblies that comprise metallic materials that do conduct electrical charges. That is, components, assemblies and sub-assemblies that include both composite and metallic materials may be used in the manufacture of, or otherwise incorporated into, larger structures (e.g. aircraft).

Such structures may encounter electromagnetic effects (EMEs) including, for example, and without limitation, lightning strikes. When a structure encounters an EME, the charge delivered to the structure travels throughout any conductive path, and can cause damage to exposed dielectric materials including, for example, composite materials. The electrical damage to composite materials from EMEs can be exacerbated if the edges of the composite material comprise exposed carbon fibers. If the path of charges resulting from an EME encounters varying materials having varying conductivities, damage at or near the material interface can occur. Such interfaces include, without limitation, fasteners/substrate interfaces; and can further include joint interfaces where, for example, seals occur.

Carbon fiber reinforced plastic materials (CFRPs) have utility in structures including, without limitation, vehicles including, without limitation, aircraft. CFRPs comprise a fiber material (e.g. carbon fibers, etc.) impregnated with a resin material (e.g. epoxy resin, acrylic resin, etc.) to make so-called prepregs. Prepregs are partially cured layers that can be manufactured into rolls that can yield unrolled sheets for use in composite material manufacture. Prepreg material, or "prepregs" can then be "laid-up" or "stacked" into multi-layered "stacks" that can be shaped on forming mandrels or other tooling, followed by curing or partially curing the shaped material to produce a composite material that, if desired, adopts desired and predetermined shapes and dimensions imparted by the tool, with the composite material having desired weight and strength. Alternately, prepregs may be oriented into a stack that is trimmed and cured to form a solid stack for use as a composite material structure or other type of composite component.

In aircraft manufacture, CFRP parts are often joined to metallic parts. Problems can occur with respect to predictably dissipating electrical charges when materials, such as CFRPs and various metals (e.g. aluminum, titanium, etc.) that have differing conductivities are joined, fastened, or are otherwise in close proximity to one another.

Coatings, especially coatings used in aircraft manufacture, also must be robust enough to possess a plurality of characteristics, but may not adequately provide all of the required functions to an equivalent or acceptable degree. For example, conductive coatings for dissipating electrical charges across metallic and non-metallic coatings alike have been tried with varying success. However, the known conductive coatings must be loaded with conductive particles to such an extent (sometimes as much as 50-70 weight percent), that other required coating characteristics suffer.

In addition, surface coatings that may be designed to alleviate electrical imbalances across various metallic and/or non-metallic surfaces must often, at least in part, address additional concerns and functions including appearance, adhesion, abrasion resistance, environmental degradation, etc.

Further, inherent coating characteristics (viscosity, etc.) may make it difficult to apply such coatings to restrictive locations and surfaces using efficient application techniques. For example, an otherwise desirable coating may be too viscous to apply to a surface using sprayers, when an application mode such as spraying could otherwise offer improvements to coating processing in terms of, efficiency, cost savings, etc.

In addition, specialized coatings having a useful range of varying properties may be expensive to prepare, maintain, store, or deploy. Otherwise useful coatings may further have long curing times, for example taking days to cure with or without the presence of elevated curing temperatures or the use of additional triggering processes. Such extended or complex curing regimens further add to the manufacturing time required, as well as increasing cost. In addition, specialized coatings may lack an adequate shelf life or pot life to be useful for very long on-site. It may further be economically impractical for a particular manufacturing facility (in terms of equipment or space requirements) to store and/or inventory coatings that require, for example, maintenance at particular temperatures.

SUMMARY

Present aspects disclose a thermoplastic polymer powder feedstock for delivery to a high-velocity sprayer for the purpose of depositing a thermoplastic polymer coating to a substrate surface or a portion of a substrate. The use of a thermoplastic polymer powder feedstock material or mixture of thermoplastic polymer powder feedstocks directed to a high-velocity sprayer (e.g. thermal or cold sprayer) allows a user to tailor or "tune" the characteristics of the resulting thermoplastic coating that is deposited onto a substrate, or portion of a substrate; including substrates that are difficult to access. Since the deposited coatings are made from thermoplastic materials, the thermoplastic coatings exhibit enhanced adhesion, do not require a curing regimen, display significantly reduced or toxicity, and can be deposited from a high-velocity sprayer that can be a thermal sprayer or a cold sprayer.

Further, according to an aspect of the disclosure, when a deposited material or material layer deposited onto a substrate is required to have a particular conductivity or resistivity different from the base substrate material or substrate materials (e.g., at a joint or interface), conductive powders can be added to the thermoplastic polymer powder feedstock. In an alternative the conductive powder is separately and substantially concurrently delivered to a sprayer with the thermoplastic polymer powder feedstock (e.g., the conductive powder delivered separately to the sprayer) such that a predetermined amount of conductive powder is incorporated into, or supplied to a sprayer concurrently with, the thermoplastic polymer powder feedstock. In this way, the thermoplastic polymer coating delivered to a substrate surface by the sprayer will have desired preselected conductivity and resistivity characteristics.

According to an aspect, a powdered feedstock formulation for a high-velocity sprayer is disclosed including at least one thermoplastic polymer powder. In another aspect, the thermoplastic polymer powder includes at least one of nylon, polyetheretherketone ("PEEK"), polyetherketoneketone ("PEKK"), polyamide, polyphenylsulfide, polyphenylsulfone, polysulfone, polyetheramide, and copolymers including Hytrel® TPC-ET (DuPont®), thermoplastic elastomers, and thermoplastic fluoroelastomers including DAI-EL® T-530 (Daikin®).

In another aspect, a powdered feedstock formulation includes at least one thermoplastic polymer powder combined with a conductive powder to form a conductive thermoplastic polymer powder feedstock, with the conductive powder present in the thermoplastic polymer powder feedstock in an amount ranging from about 1% to about 9% by volume of the feedstock formulation. In another aspect, the conductive powder includes at least one of titanium, nickel alloy, copper, carbon black, graphene powder, or carbon nanotubes.

In another aspect, the thermoplastic polymer powder and the conductive powder are mixed into a single conductive feedstock. In a further aspect, the thermoplastic polymer powder and the conductive powder are not mixed into a feedstock before separately supplying the two components to a sprayer. According to an aspect, the thermoplastic polymer powder and the conductive powder are provided via separate feedstock supply lines to the sprayer, substantially concurrently.

In another aspect, a thermoplastic polymer powder feedstock includes two or more different thermoplastic polymer materials.

In another aspect, a system is disclosed that includes a thermoplastic polymer powder feedstock including at least one of nylon, polyetheretherketone, polyetherketoneketone, polyamide, polyphenylsulfide, polyphenylsulfone, polysulfone, and polyetheramide. The system further includes a high-velocity sprayer in communication with the thermoplastic polymer powder feedstock.

In another aspect, the thermoplastic polymer powder feedstock includes at least two of nylon, polyetheretherketone, polyetherketoneketone, polyamide, polyphenylsulfide, polyphenylsulfone, polysulfone, and polyetheramide.

In another aspect, the thermoplastic polymer powder feedstock includes at least one conductive powder and at least one of nylon, polyetheretherketone, polyetherketoneketone, polyamide, polyphenylsulfide, polyphenylsulfone, polysulfone, and polyetheramide.

In another aspect, the thermoplastic polymer powder feedstock further includes a conductive powder to form a conductive thermoplastic polymer powder feedstock mixture, with the conductive powder including at least one of titanium, nickel alloy, copper, carbon black, graphene powder, or carbon nanotubes. In another aspect, the conductive powder is present in the conductive thermoplastic polymer powder feedstock mixture in an amount ranging from about 1% to about 9% by volume of the conductive thermoplastic polymer powder feedstock mixture.

In another aspect, systems are disclosed where different thermoplastic polymer powder feedstocks are provided with or without a conductive powder and the conductive various powders are not mixed before introducing each of the powders to a sprayer. In such aspect, the separate components (e.g., one or more different thermoplastic polymer powder feedstocks and a conductive powder) are directed separately from a discrete supply of the various powder feedstocks to the sprayer via separate feedlines. In a further aspect, the separate feeds of the different powder feedstocks are directed and/or delivered substantially concurrently to the sprayer via separate feedlines, or are directed to the sprayer according to a programmed delivery sequence from separate feedstocks through a single feedline.

In yet another aspect, the high-velocity sprayer is in communication with a robot or a robotic arm that is in turn in communication with a controller for directing the motion of the sprayer. One or more further controllers can be in communication with the sprayer to control the amounts of feedstock powders delivered to the sprayer, as well as controlling the amount of thermoplastic polymer powder feedstock material and the amount of the conductive powder feedstock delivered to a substrate surface as a coating on the substrate surface.

Further aspects are directed to methods for delivering a thermoplastic coating to a substrate surface, with the method including directing an amount of at least one thermoplastic polymer powder feedstock to a high-velocity sprayer to form a thermoplastic spray formulation, with the formulation including at least one of nylon, polyetheretherketone, polyetherketoneketone, polyamide, polyphenylsulfide, polyphenylsulfone, polysulfone, and polyetheramide. The thermoplastic polymer spray formulation is then directed from the high-velocity sprayer to a substrate surface, followed by forming a thermoplastic polymer coating on the substrate surface. The high-velocity sprayer can be a thermal sprayer or a cold sprayer.

In another aspect, a two or more different thermoplastic polymer powder feedstocks are directed to the high-velocity sprayer and the different thermoplastic polymer powder feedstocks are either first mixed together to form a thermoplastic polymer powder feedstock mixture that is then directed to the sprayer via a single feed line, or the different thermoplastic polymer powder feedstocks are directed separately to the high-velocity sprayer via separate feed lines. According to another aspect, the separately directed thermoplastic polymer powder feedstocks are directed to the high-velocity sprayer substantially concurrently, or are directed to the sprayer via one or more feedlines according to a programmed delivery sequence. In yet another aspect, the high-velocity sprayer is in communication with a robot or a robotic arm that is in turn in communication with a controller for directing the motion of the sprayer. One or more further controllers can be in communication with the sprayer to control the amounts of one or more thermoplastic polymer powder feedstock materials delivered to the sprayer as well as controlling the amount of thermoplastic polymer coating delivered to a substrate surface.

In further aspects, methods include combining the at least one thermoplastic polymer powder feedstock with a conductive powder feedstock to form a conductive thermoplastic polymer powder mixture as a feedstock, with the conductive powder present in the conductive thermoplastic polymer powder feedstock mixture in an amount ranging from about 1% to about 9% by volume of the feedstock mixture formulation. In another aspect, the conductive powder feedstock includes at least one of titanium, nickel alloy, copper, carbon black, graphene powder or carbon nanotubes. As described above, instead of mixing different powdered feedstock components, the differing feedstock powders can be delivered to the high velocity sprayer via separate feedlines, and are therefore combined at the sprayer. According to another aspect, the separately directed thermoplastic polymer powder feedstocks (alone, or in combination with the conductive powder feedstock(s)) are directed to the high-velocity sprayer substantially concurrently, or are directed to the sprayer via one or more feedlines according to a programmed delivery sequence.

According to further aspects, when a thermoplastic polymer powder feedstock provided as a spray formulation includes a conductive powder feedstock component, the resulting conductive thermoplastic coating delivered from the sprayer to a substrate surface has a resistivity ranging from about $1\times10e^{5}$ to about $1\times10e^{11}$ ohm-meter (ohm-m), and preferably from about $1\times10e^{5}$ to about $1\times10e^{8}$ ohm-m.

Aspects of the present disclosure further contemplate, without limitation, objects, components, sub-assemblies, assemblies having substrate surfaces that include the thermoplastic coating and/or the conductive thermoplastic coating delivered to a substrate surface according to the methods presented. with the objects including, for example, and without limitation, a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned or unmanned hovercraft, a manned surface water borne vehicle, an unmanned surface water borne vehicle, a manned sub-surface water borne vehicle, an unmanned sub-surface water borne vehicle, and combinations thereof.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

FIG. 1 is an illustration of an aspect of the present disclosure showing a thermoplastic polymer powder feedstock and a system including the thermoplastic polymer powder feedstock and a high-velocity sprayer for depositing a thermoplastic polymer coating onto a substrate surface;

FIG. 2A is an illustration of an aspect of the present disclosure showing the mixing of more than one thermoplastic polymer powder feedstocks to form a thermoplastic powder feedstock mixture for use as a spray formulation, and a system including the thermoplastic powder feedstock mixture and a high-velocity sprayer for depositing a tunable thermoplastic polymer coating onto a substrate surface;

FIG. 2B is an illustration of an aspect of the present disclosure showing a plurality of thermoplastic powder feedstocks delivered via separate feedlines to the sprayer shown in FIG. 2A, and a system for depositing a tunable thermoplastic polymer coating onto a substrate surface;

FIG. 3A is an illustration of an aspect of the present disclosure showing at least one thermoplastic polymer powder feedstock mixed with at least one conductive powder feedstock to form a conductive thermoplastic powder feedstock mixture, and a system including the conductive thermoplastic polymer powder feedstock mixture and a high-velocity sprayer for depositing a conductive thermoplastic polymer coating onto a substrate surface;

FIG. 3B is an illustration of an aspect of the present disclosure showing at least one thermoplastic polymer powder feedstock and a conductive powder feedstock shown in FIG. 3A, and a system including a high-velocity sprayer for depositing a conductive thermoplastic polymer coating onto a substrate surface, with more than one thermoplastic polymer powder feedstock and the one or more conductive powder feedstock delivered or directed to the sprayer via separate feed lines;

FIG. 4A is an illustration of an aspect of the present disclosure showing more than one thermoplastic polymer powder feedstocks mixed with a conductive powder feedstock to form a conductive thermoplastic powder feedstock mixture, and a system including the conductive thermoplastic polymer powder feedstock mixture and a high-velocity sprayer for depositing a conductive thermoplastic polymer coating onto a substrate surface;

FIG. 4B is an illustration of an aspect of the present disclosure showing two different thermoplastic polymer powder feedstocks and a conductive powder feedstock shown in FIG. 4A, and a system including the two different thermoplastic polymer powder feedstocks, the conductive powder feedstock and a high-velocity sprayer for depositing a conductive thermoplastic polymer coating onto a substrate surface, with the two thermoplastic polymer powder feedstocks and the conductive powder feedstock delivered or directed to the sprayer via separate feed lines;

FIG. 5 is an illustration of an aircraft;

FIG. 6 is a flowchart outing a method according to aspects of the present disclosure;

FIG. 7 is a flowchart outing a method according to aspects of the present disclosure; and FIG. 8 is a flowchart outing a method according to aspects of the present disclosure.

DETAILED DESCRIPTION

Aspects of the present disclosure are directed to powdered thermoplastic formulations that can be tunable, or otherwise have their characteristics changed in real time during deposition and that can include conductive materials and that can also be conductively tunable. The powdered thermoplastic polymer feedstocks can include at least one conductive powdered material to form a conductive thermoplastic powder feedstock mixture that can be deposited onto a substrate surface via a high-velocity sprayer to form a tunable conductive thermoplastic coating on a substrate surface, with the conductive thermoplastic coating having predetermined characteristics.

Aspects of disclosed thermoplastic polymer powder powdered conductive coating formulations can be tuned or tailored, including in real time, to provide a wide range of required coating characteristics, while also providing robust protective coating qualities to the substrates being coated with the presently disclosed thermoplastic coatings.

According to further aspects, powdered conductive thermoplastic polymer coating formulations (that contain a conductive powder) can be tuned or tailored, including in real time, and provide a wide range of required characteristics for electrically conductive thermoplastic coatings offering a particular, and wide-ranging amount of resistivity or conductivity, while also providing robust protective qualities to the substrates being coated with the presently disclosed conductive thermoplastic coatings.

Additionally, aspects of the present disclosure are directed to thermoplastic polymer powder coating formulations that can be tailored as precursor feedstock mixtures, or that can be delivered substantially concurrently or in predetermined sequence to a sprayer (e.g., a predetermined programmed sequence) from separate feedstock sources or supplies to a high velocity sprayer. The sprayer then delivers the thermoplastic polymer powder coating formulations to form a thermoplastic coating, using high-velocity spraying techniques, to metallic and/or non-metallic substrates and components, with the thermoplastic coatings having predetermined characteristics that can be tuned in real time (e.g., in real time during application to a substrate surface, etc.). When a conductive powdered feedstock material is present in the thermoplastic polymer powder feedstock, various characteristics of the resulting applied conductive thermoplastic coatings can be predictably tailored, even in substantially real-time, by changing the proportions of powdered feedstock constituents (e.g., the proportion(s) of the at least one thermoplastic polymer powder feedstock and the conductive powder feedstock) that are provided to the sprayer.

Without being limiting, the average particle size of the thermoplastic polymer powder feedstock(s) used according to aspects of the present disclosure range from about 20 µm to about 300 µm. In addition, without being limiting, the average particle size of the conductive powder feedstock(s) used according to aspects of the present disclosure range from about 5 µm to about 80 µm. The high-velocity sprayers used in connection with aspects of the present disclosure include sprayers able to disperse a feedstock at velocities ranging from about 20 m/s to about 1200 m/s. Such sprayers include thermal (e.g., flame sprayers, etc.) and cold sprayers.

According to one aspect, the thermoplastic polymer powder comprises at least one of a nylon, polyetheretherketone (equivalently referred to as PEEK), polyetherketoneketone (equivalently referred to as PEKK), polyamide, polyphenylsulfide, polyphenylsulfone, polysulfone, and polyetheramide.

In further aspects, the thermoplastic polymer powder feedstock comprises at least one of a thermoplastic polyester elastomer powder or a thermoplastic fluoroelastomer powder. Contemplated thermoplastic elastomer powders include those that can be obtained as PEEK, PEKK, Hytrel® 5526 (DuPont); Dai-El™, (Daikin®); Hipex®, (Kraiburg), etc. The thermoplastic polymer powder feedstocks preferably have an average particle size ranging from about 20 µm to about 300 µm.

Polyether ether ketone (PEEK) is an organic thermoplastic in the polyaryletherketone (PAEK) family, with PEEK having the general formula:

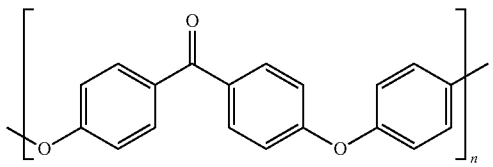

PEEK has a coefficient of thermal expansion value (depending upon grade) ranging from of about 20 to about 80 ppm/° F. (i.e. about 2 to about $8 \times 10^{-5}$ in./in/° F.), a Young's modulus value of about 3.6 GPa and a tensile strength ranging from about 90 MPa to about 100 MPa. PEEK is highly resistant to thermal degradation as well as attack by both organic and aqueous environments (e.g. environments including, without limitation, those environments coming into contact with fuels and fuel systems, etc.), and has a high resistance to biodegradation.

According to another, and as also presented in the Examples below, ret polymer powder. Polyetherketoneketone (PEKK) is a semi-crystalline thermoplastic in the PAEK family, with PEKK having the general formula:

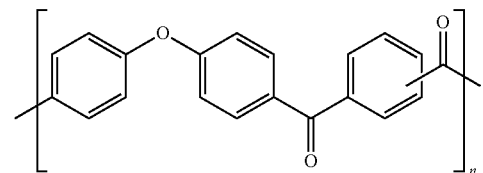

PEKK has a coefficient of thermal expansion value (depending upon grade) of about 10 to about 20 ppm/° F. (i.e. about 1 to about $2 \times 10^{-5}$ in./in/° F.), a Young's modulus value of about 4.5 GPa and a tensile strength of about 102 MPa. PEKK is also highly resistant to thermal degradation as well as attack by both organic and aqueous environments (e.g. environments including, without limitation, those environments coming into contact with fuels and fuel systems, etc.), and has a high resistance to biodegradation.

The density of the contemplated thermoplastic polymer coating deposited onto a substrate surface can be of any desired thickness, but is particularly deposited at a thickness ranging from about 25 µm to about 5 mm, with the contemplated thermoplastic coatings having a material density ranging from about 1.0 g/cc to about 1.8 g/cc. Being able to deposit a thermoplastic coating having such tailorable and predetermined densities and deposited to such desired thicknesses at reduced densities realizes substantial weight reduction compared with material coatings presently used in, for example, aircraft production where overall weight impacts vehicle range, fuel consumption, available cargo capacity, manufacturing time, etc., all of which can impact total production cost.

If desired, according to further contemplated aspects, the thermoplastic coatings (and when conductive components are present to form conductive thermoplastic coatings, such resulting conductive thermoplastic coatings) can be tailored or "tuned", for example, in real time during the coating deposition process, such that the deposited coatings possess various desired and predetermined characteristics, e.g., physical, chemical, thermal, etc. Such aforementioned tailorable characteristics are. in addition to the desired and tailorable conductivity or resistivity values achievable with the presently disclosed conductive thermoplastic coatings. This can be achieved by providing differing powdered thermoplastic polymer feedstock(s), differing amounts (e.g., differing comparative ratios, etc.) of differing powdered thermoplastic polymer feedstock(s), additional numbers of differing powdered thermoplastic polymer feedstock(s), or by providing additives to the powdered thermoplastic polymer feedstock(s).

According to other aspects, contemplated conductive powder feedstock materials include, without limitation, various metallic powders including titanium, nickel alloy, copper, carbon black, graphene powder, or carbon nanotubes. The contemplated conductive powder feedstock materials preferably have an average particle size ranging from about 5 μm to about 80 μm.

The powdered thermoplastic polymer feedstock formulations disclosed, according to aspects of the present disclosure, when combined or otherwise mixed with one or more conductive powder feedstock(s) produce a resulting conductive thermoplastic polymer feedstock mixture that yields a conductive thermoplastic polymer coating on a substrate surface, with the resulting conductive coating having a desired and predetermined resistivity ranging from about $1\times10e^5$ to about $1\times10e^{11}$ ohm-meter (ohm-m), and preferably from about $1\times10e^5$ to about $1\times10e^8$ ohm-m.

To provide a conductive thermoplastic coating on a substrate surface having a resistivity ranging from about $1\times10e^5$ to about $1\times10e^{11}$ ohm-meter (ohm-m), and preferably from about $1\times10e^5$ to about $1\times10e^8$ ohm-m, the conductive thermoplastic polymer powder feedstock(s) have a relative percentage by volume of the conductive component (e.g. the conductive powder) ranging from about 1% to about 9% by volume of the total volume of conductive thermoplastic polymer powder provided to the sprayer.

It is further understood that the thermoplastic polymer powder (e.g., provided as a feedstock to the sprayer) can be a mixture that is formed prior to the introduction of the multi-component feedstock to the sprayer. In one aspect, when the powdered feedstock comprises more than one type of powder component (e.g. more than one thermoplastic polymer powder feedstock; one thermoplastic polymer powder feedstock and at least one type of conductive powder feedstock; more than one thermoplastic polymer powder feedstock and at least one type of conductive powder feedstock, etc.), the multiple component powder feedstock materials can be mixed together to form a thermoplastic (or conductive thermoplastic) polymer powder mixture, or "feedstock mixture". The feedstock mixture is then introduced as the feedstock to the sprayer. For the purpose of the present disclosure, the term "feedstock" refers to a precursor material that is supplied from a supply of a material to a mixture, or is supplied directly to a sprayer via a feed line from a supply of a material.

In an alternate aspect, when the powdered feedstock comprises more than one type of powder component (e.g., more than one thermoplastic polymer powder feedstock; one thermoplastic polymer powder feedstock and at least one conductive powder feedstock; more than one thermoplastic polymer powder feedstock and at least one conductive powder feedstock, etc.), the multiple powdered feedstock components can be directed via separate feed lines to the sprayer, such that no multiple component powdered feedstock mixture is pre-formed as a single feedstock that is then provided to the sprayer. According to this aspect, on or more controllers can be used to monitor and control the rate at which a single powdered feedstock is released from a supply and directed to the sprayer. In this way, the individual flow rate of a particular powdered feedstock component is controlled, monitored and maintained to insure that a particular ratio of feedstock components that arrive at (e.g., are delivered to) the sprayer is achieved and, if desired, maintained for the duration of the material (e.g. coating) spray deposition onto a substrate surface. For example, in this aspect, to produce a conductive thermoplastic coating having a resistivity ranging from about $1\times10e^5$ to $10e^8$ ohm/m, the presence of an amount of conductive powder feedstock delivered to the sprayer ranges from about 1% to about 9% by volume of the combined powdered material feedstock delivered to the sprayer (e.g., the combined powdered material volume equaling the volume of thermoplastic polymer powder feedstock combined with the conductive powder feedstock volume, and, for example, controlled, monitored and maintained by regulating the comparative flow rates of the individual component feedstocks fed via one or more feed lines to the sprayer, etc.).

According to present aspects, a formed conductive thermoplastic polymer powder feedstock mixture becomes the thermal sprayer feedstock material that is converted by the thermal sprayer into a conductive coating or conductive sealant that is desirably applied (via the thermal sprayer) to a metal, non-metal, or metal/non-metal interface at, for example, a fastener, or a joint, or to a component edge as an edge seal. The comparative amount of conductive powder that is selected and added to the thermoplastic powder to form the conductive thermoplastic powder mixture, is selected to achieve a particular conductive effect in the eventual conductive thermoplastic coating and/or conductive thermoplastic sealant that is deposited onto a substrate in the form of a conductive coating or conductive sealant. That is, by tailoring the amount of conductive powder added to form the form the thermoplastic powder mixture used as the thermal sprayer feedstock material, the resulting material exiting the thermal sprayer and deposited onto a substrate surface will become a coating or sealant having a particularly preselected resistivity on the substrate surface.

The tailorable conductive thermoplastic coatings that are obtained according to aspects of the present disclosure provide conductive flexibility with respect to dissipating static charges that build up with and along a particular material, or are caused by significant electrical events including, for example, lightning strikes. In addition, the conductive thermoplastic coatings disclosed herein have significant advantages commensurate with thermoplastic coatings in terms of ease of handling, ease of application, retention and adhesion characteristics, safety due to lower toxicity (e.g., as compared with polysulfides and chromates, etc.), etc.

Still further, since the presently disclosed conductive coatings are thermoplastic in nature, the conductive thermoplastic coatings or sealants do not require a separate curing step after application. In other words, the thermoplastic coatings/sealants will "set" upon cooling and require no subsequent curing protocol or regimen to "set up". The disclosed thermoplastic polymer coatings and conductive thermoplastic polymer coatings can be fabricated to further comprise a particular color to, for example, facilitate inspection with respect to both initial application quality as well as repair and maintenance inspections that will be conducted at various quality control and servicing intervals. Still further, if repair or replacement of a thermoplastic polymer coated part or surface (or a conductive thermoplastic polymer coated part or surface) is required, such coated parts or the coatings on such coated parts can be more easily removed using various solvent or mechanical removal as compared to, for example, epoxy- or acrylamide-based coatings and/or sealants that require curing regimens.

With respect to adhesion, the conductive coatings/sealants of the present disclosure have adhesion values ranging from about 5 lbs/in to about 50 lbs/in wide area on both metals and non-metals when performing adhesion testing set forth in ASTM D6862-11 (2016) Standard Test Method for 90° Peel Resistance.

In this way, the thermoplastic coating and sealant systems disclosed herein combine the benefits of thermoplastic material characteristics with high-velocity spray techniques and systems (e.g., thermal flame spraying and cold spraying), and the deposited thermoplastic coating and sealant characteristics are further tailorable to a desired end use as coatings and/or sealants on a substrate surface. When a conductive powder feedstock component is added to the thermoplastic powder feedstock, the conductive coatings deposited to a substrate surface have electrical characteristics (e.g., conductivity, resistivity, etc.) that can also be tailored as required for their intended use as conductive coatings, particularly as coatings and/or sealants on homogeneous or hybrid surfaces comprising metallic and/or non-metallic components.

According to a further aspect, the presently known thermal and cold spray equipment and systems can be retrofitted to deposit coatings made from the presently disclosed thermoplastic formulations that can also include conductive materials to form conductive thermoplastic coatings. Particularly preferred thermal sprayers include flame sprayers.

Thermal spraying techniques are coating processes where melted or heated materials are sprayed onto (e.g., deposited onto) a surface. Feedstock material is supplied to the sprayer as a coating precursor. The feedstock is heated by electrical (e.g., plasma or arc) or chemical means (e.g., combustion flame). Thermal spraying can achieve coatings having a coating thickness ranging from about 20 µm to about 5.0 mm over a large area and at a high deposition rate as compared to other known coating processes, with the presently contemplated deposition rate ranging, for example, from about 20 µm on 1 ft$^2$ in 10 seconds, or greater, etc., or coatings deposited at a rate ranging from about 1 to about 50 grams/second (g/s), etc.

Flame spray coating refers to a type of thermal spraying where melted or heated feedstock materials are sprayed onto a substrate surface. The feedstock (e.g., the coating precursor material) is heated by electrical (e.g., plasma or arc) or chemical means (e.g., combustion flame). During coating processes the substrate preferably undergoes no distortion, as the substrate temperature remains below about 250° F. during the spray operation. When the substrate is metallic, the substrate is not metallurgically altered. Coating thickness ranging from about 2 µm to 5.0 mm can be achieved, with deposition (e.g., coating application) rates for such thicknesses ranging from at least about 20 µm on 1 ft$^2$ in 10 seconds, or greater, etc., or from about 1 to about 50 g/s.

Without limitation, thermal (e.g., flame, etc.) sprayers useful according to present aspects include, for example, TAFA Models 5220 HP/HVOF®, 8200 HP/HVOF®, 825 JPid HP/HVOF® (ID), 7780 (UPCC), JP-8000 HP/HVOF®, JP-5000° HP/HVOF® (Praxair, Inc., Danbury, Conn.); Powderjet 86, Powderjet 85 (Metallizing Equipment Co. Pvt. LTD. (Jodhpur, India) Plasma Technology Inc., Torrence, Calif.): and systems available from Plasma Technology Inc. (Torrence Calif.), etc. Universal Flame Spray System PG-550 (Alamo Supply Co., Ltd., (Houston, Tex.), etc. Various controllers can be used in conjunction with the TAFA systems described including, for example, TAFA Model 7700GF HVOF System (Praxair, Inc., Danbury, Conn.).

In contrast with the flame sprayer systems mentioned above, in "cold spray" systems powder particles (e.g., feedstock particles) typically having an average particle size ranging from about 10 µm to about 40 µm, and are accelerated to very high velocities (200 to 1200 m/s) by a supersonic compressed gas jet at temperatures below their melting point. Upon impact with the substrate, the particles experience extreme and rapid plastic deformation that disrupts the thin surface oxide films that are present on all metals and alloys. This allows intimate conformal contact between the exposed substrate surfaces under high local pressure, permitting bonding to occur with the layers of deposited material. The layers of deposited material can be built up rapidly, with very high deposition efficiency (e.g., above 90% in some cases). Using cold spray systems, materials can be deposited without high thermal loads, producing coatings with low porosity and oxygen content. Without limitation, cold sprayers useful according to present aspects include, for example, Impact Spray System 5/8; Impact Spray System 5/11 (Impact Innovations Waldkraiburg, Germany), etc.

Cold spray processes refer to the thermal spray processes and collectively refers to processes known as cold gas dynamic spraying, kinetic spraying, high velocity particle consolidation (HPVC), high velocity powder deposition, supersonic particle/powder deposition (SPD), and the like. In cold spraying, a high velocity gas jet, for example, a deLaval converging/diverging nozzle can be used to accelerate powder particles generally having an average particle size ranging from about 1 µm to about 50 µm. The particles are accelerated by the gas jet at a temperature that is below the melting point of the feedstock material particles. The particles are then sprayed onto a substrate that can be located about 25 mm from the nozzle. The particles impact the substrate and form a coating. Without being bound by a particular theory, it is believed that the kinetic energy of the particles, rather than an elevated temperature causes the particles to plastically deform on impact with the substrate surface to form "splats" that bond together to produce the coating. The coatings formed from the cold sprayed particles are formed in the solid state, and not via the melting followed by solidification as occurs in thermal spray processes (e.g., flame spraying, etc.) using elevated temperature. Such a cold spray process avoids deleterious effects that can be caused by high temperature deposition, including, for example, high-temperature oxidation, evaporation, melting, crystallization, residual stress, gas release, etc. As a result, according to present aspects, cold spraying can be advantageously used for temperature sensitive (e.g., heat sensitive) substrates. The resulting coatings according to present aspects, possess characteristics including high strength, low porosity and minimal residual stress.

As mentioned above, characteristics of the thermoplastic coatings contemplated according to present aspects can be altered in a predetermined fashion by providing a predetermined combination of materials to form a tailored thermoplastic polymer powder feedstock material, and by further incorporating additives, including, without limitation, additives such as pigments, dyes, or coloring agents, etc. Such coloring agents can facilitate the inspection of the condition of coatings during, for example, inspections, etc.

As mentioned previously, the sprayers used in the systems and methods disclosed herein can be operated manually, but can also be automated by incorporating or otherwise attaching the sprayer to a robot, or robotic arm that includes or is in communication with sensors, controllers, software and hardware, etc. for the purpose of controlling the operation and movement of the sprayer and the operation of the sprayer during, for example a material deposition (e.g., coating, etc.) cycle. The robot and equipment associated with the robot and sprayer can be operated and powered directly, and further can be operated remotely in response to, for example, wireless signals, etc.

Where coating characteristics have included robustness in terms of adhesion and/or resistance to environmental factors such as those encountered, for example, in vehicle fuel tanks, etc., coating materials have been classified with various toxicities, making their handling and application hazardous to personnel. In addition, various application sites have been difficult to access. In addition, maintaining and/or replacing the coatings presently in use has resulted in significant repair and replacement time, as the removal of cured coatings. The coatings made possible according to aspects of the present disclosure, being thermoplastic materials, have significantly reduced toxicity during application, and can be more easily removed and replaced (e.g., at scheduled routine inspection and/or replacement).

In addition, the presently disclosed coatings made from the disclosed thermoplastic polymer powder formulations maintain adhesion characteristics over a required service period that is at least equivalent to or exceeds that, which is achievable using the previously available coatings and sealants (e.g., epoxy and acrylamide based options, etc.). The adhesion of the thermoplastic polymer coating made from the disclosed thermoplastic polymer powder formulations have an adhesion ranging from about 5 to about 50 lbs./in$^2$ wide area when performing adhesion testing set forth in ASTM D6862-11 (2016) Standard Test Method for 90° Peel Resistance.

When a conductive film or coating is desired, the contemplated thermoplastic polymer coatings, sealants, films, etc. can be tailored to achieve a desired surface resistivity, for example, ranging from about $1\times10e^5$ to about $1\times10e^{11}$ ohm-meter (ohm-m), and preferably from about $1\times10e^5$ to about $1\times10e^8$ ohm-m, when the conductive component composition of the thermoplastic polymer powder feedstock ranges from about 1% to about 9% by volume of the conductive thermoplastic polymer powder feedstock. The desired characteristics of the coating produced, including, for example, the desired resistivity, setting time, thickness, etc., determines the concentration of the conductive powder feedstock component that is incorporated into the thermoplastic polymer powder feedstock, or that is supplied to the sprayer substantially concurrently with the thermoplastic polymer powder feedstock (e.g., in the situation where feedstocks are supplied to the sprayer separately and a feedstock mixture is not prepared and then delivered to the sprayer.

Coatings and sealants typically applied to spatially restrictive and other difficult-to-access areas in various assemblies and sub-assemblies found, for example, in vehicles including aircraft have required coatings and sealants (e.g., epoxies and acrylamides, etc.) that require significant curing times in excess of many days. Components for use in such assemblies and sub-assemblies comprising the presently disclosed coatings find particular utility in the manufacture of vehicles, including aircraft, as well as structural components used in the manufacture of fuel tanks on such vehicles.

Further, long curing times delay manufacturing and increase manufacturing cost. In contrast to epoxy-based and other materials requiring curing time of several days or longer, the presently disclosed thermoplastic polymer coatings and sealants applied according to the presently disclosed methods do not require curing, and only require the time necessary for the thermoplastic material to cool and "set" (e.g. thermoplastic material "set" times understood to range from about less than a few mins. to about several mins., or the amount of time a thermoplastic material takes to cool from an applied temperature to about room (ambient) temperature, assuming coating thicknesses ranging from about 2.5 mm to about 5.0 mm). According to present aspects, such "set" times for the deposited thermoplastic polymer coatings and sealants disclosed herein (including the deposited conductive thermoplastic polymer coatings and sealants) are in strong contrast to the curing times of several hours or even several days that are required to cure sealants and coatings previously used for the purposes intended herein on the substrates and substrate surfaces intended and disclosed herein.

While many of the characteristics of thermoplastic polymers may have been desirable for use in coatings and sealants in hard to access locations in assemblies and sub-assemblies, use of such thermoplastic polymeric coatings had been particularly hampered where the coatings or sealants required conductivity (or needed to have certain resistivities), or where it had not been previously possible to deposit a thermoplastic coating having variable or tailored characteristics. According to aspects of the present disclosure, the fabrication and use of electrically conductive coatings and sealants that have multiple physical and chemical characteristics tailored that are made from presently disclosed thermoplastic polymer powder formulations, and applied according to presently disclosed methods has now been achieved.

FIG. 1 shows a block diagram outlining an aspect showing a thermoplastic polymer powder feedstock and a system 10 including directing the thermoplastic polymer powder feedstock to a high-velocity sprayer for depositing a thermoplastic polymer coating onto a substrate surface. As shown in FIG. 1, a thermoplastic polymer powder feedstock 12 is directed from a thermoplastic polymer powder feedstock supply via a feedline 11 in communication with the thermoplastic polymer powder feedstock 12 and also in communication with a high-velocity sprayer 14. Predetermined amounts of the thermoplastic polymer powder feedstock 12 can be directed by any desirable means that will direct the thermoplastic polymer powder feedstock 12 to the high-velocity sprayer 14, including automated means regulated by a controller (not shown) and subject to, for example, software and hardware known to control, for example, feedstock flow rates, etc. The high-velocity sprayer can be a thermal sprayer or a cold sprayer. As shown in FIG. 1, the thermoplastic polymer powder feedstock 12 is converted by the high-velocity sprayer 14 into a thermoplastic polymer coating 16a onto substrate 16. While the high-velocity sprayer 14 can be operated manually, FIG. 1 shows an optional robotic arm 13 (equivalently referred to herein as a "robot") that can be in communication with a controller 15. Controller 15 can further optionally be in communication with remote or integrated software or hardware, as desired, to control robotic arm movement as well as control flow rates and amounts of material deposited as a thermoplastic coating 16a onto a substrate 16. Optionally, additional controllers (not shown) can be integrated into system 10 to control one or more aspects of system 10.

Figure 2A:
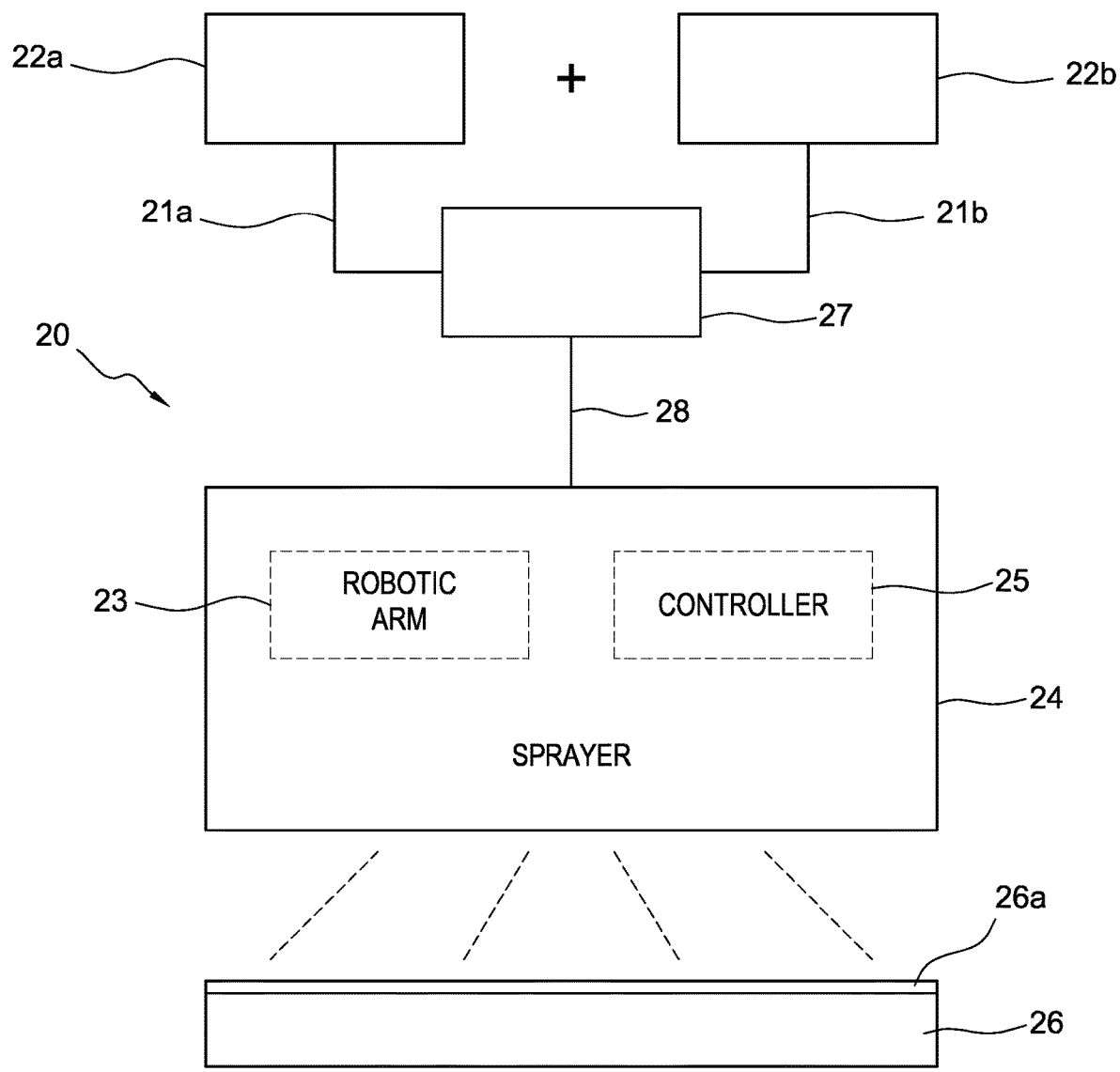

FIG. 2A shows a block diagram outlining an aspect showing a thermoplastic polymer powder feedstock mixture and system 20 including mixing multiple thermoplastic polymer powder feedstocks to form a thermoplastic powder mixture, and then directing an amount of the thermoplastic powder mixture to a high-velocity sprayer and depositing a thermoplastic polymer coating onto a substrate surface. As shown in FIG. 2A, in system 20, predetermined amounts of a first thermoplastic polymer feedstock 22a, and a second thermoplastic polymer feedstock 22b are directed to a mixing vessel (not shown). The predetermined amounts of the first and second thermoplastic polymer feedstocks 22a, 22b are delivered via first and second thermoplastic polymer powder feedstock feedlines 21a and 21b, respectively, and mixed together to form a thermoplastic polymer powder feedstock mixture 27. The thermoplastic polymer powder feedstock mixture 27 is directed via feedstock mixture feedline 28 to high-velocity sprayer 24. Feedstock mixture Feedline 28, as shown in FIG. 2A, is in communication with thermoplastic polymer powder feedstock mixture 27 and the high-velocity sprayer 24. Predetermined amounts of the first thermoplastic powder feedstock 22a and the second thermoplastic polymer powder feedstock 22b can be directed from respective feedstock supplies (not shown) by any desirable means, including automated means regulated by a controller (not shown) and subject to, for example, software and hardware known to control, for example, feedstock flow rates from a supply to a sprayer, etc. The high-velocity sprayer 24 can be a thermal sprayer or a cold sprayer. As shown in FIG. 2A, the thermoplastic polymer powder feedstock mixture 27 is converted by the high-velocity sprayer 24 into a thermoplastic polymer coating 26a deposited onto substrate 26. While the high-velocity sprayer 24 can be operated manually, FIG. 2A shows an optional robotic arm 23 (equivalently referred to herein as a "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 20 to control one or more aspects of system 20.

Figure 2B:
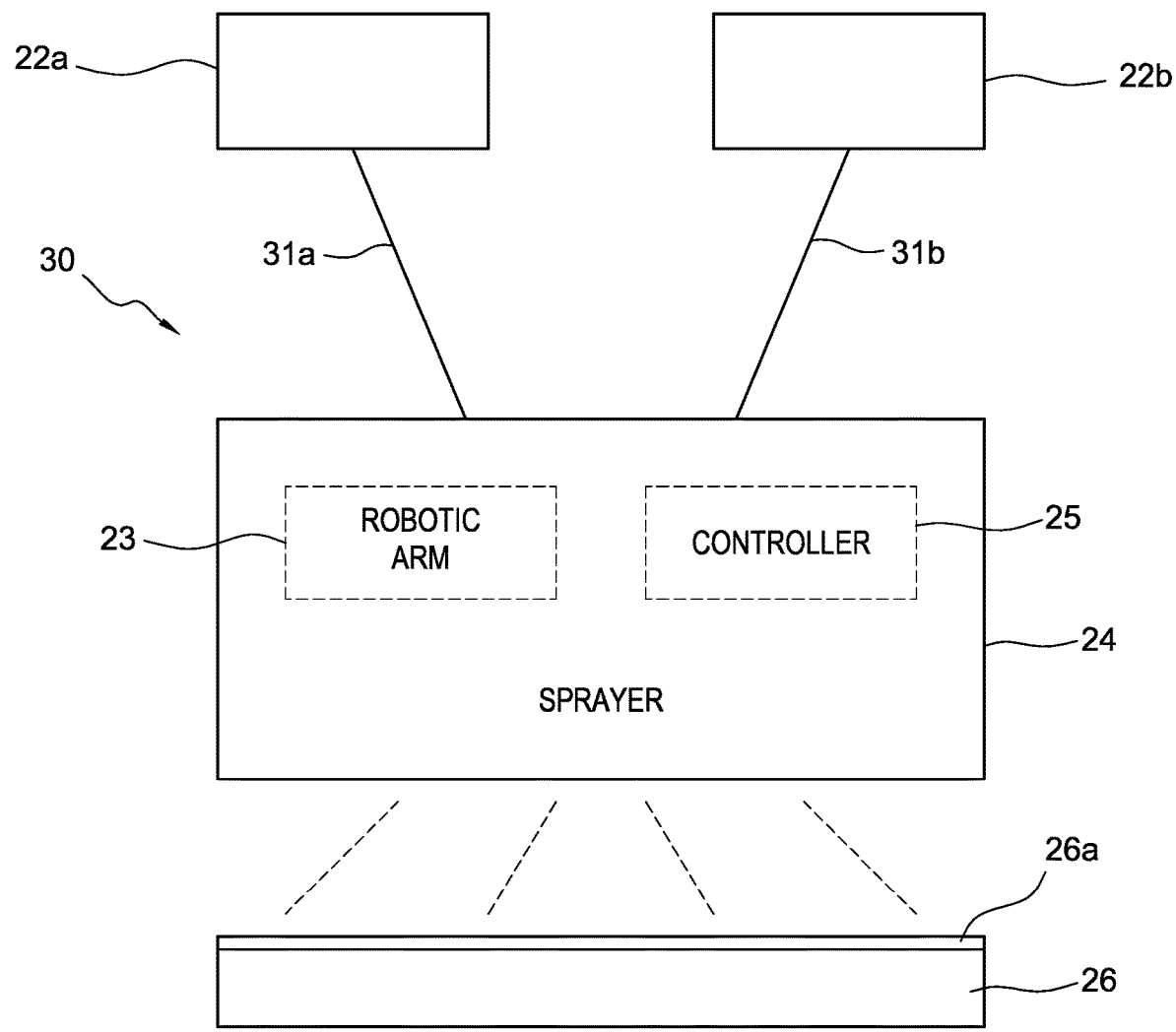

FIG. 2B shows a block diagram outlining an aspect showing two thermoplastic polymer powder feedstocks and system 30 similar to system 20 shown in FIG. 2A, except that, as shown in FIG. 2B, system 30 comprises first and second thermoplastic polymer powder feedstock feedlines 31a and 31b in communication with the high-velocity sprayer 24 and the first and second thermoplastic polymer powder feedstocks 22a and 22b, respectively. That is, as shown in FIG. 2B, amounts of the first and second thermoplastic polymer powder feedstocks 22a, 22b are not mixed together to form a feedstock mixture. Instead, according to the aspect shown in FIG. 2B as system 30, a predetermined amount of the first thermoplastic polymer powder feedstock 22a is directed to high-velocity sprayer 24 via first thermoplastic polymer powder feedstock feedline 31a. Similarly, a predetermined amount of the second thermoplastic polymer powder feedstock 22b is directed to the high-velocity sprayer 24 via second thermoplastic polymer powder feedstock feedline 31b. While the high-velocity sprayer 24 can be operated manually, FIG. 2B shows an optional robotic arm 23 (equivalently referred to herein as a "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 30 to control one or more aspects of system 30.

Figure 3A:
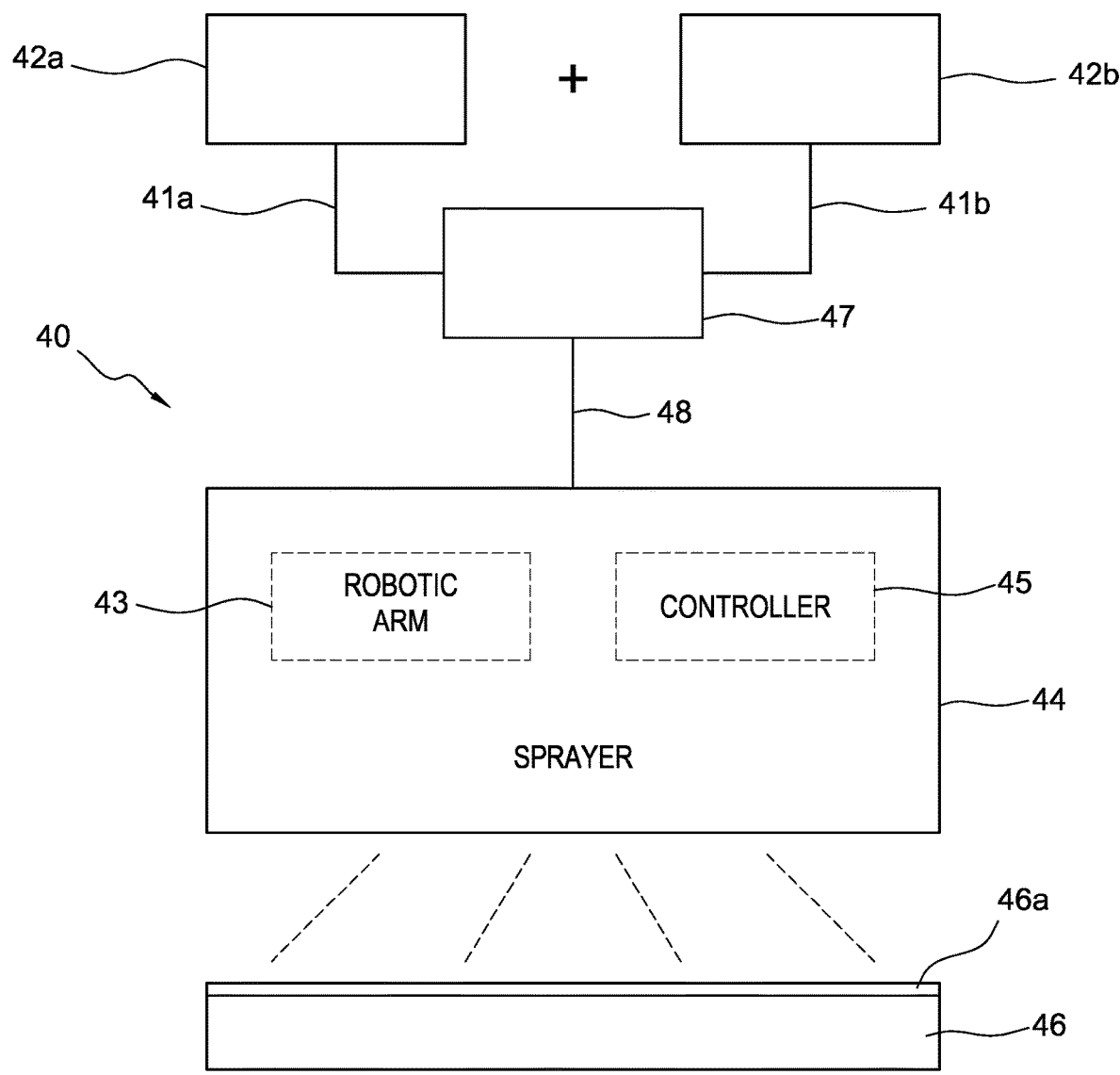

FIG. 3A shows a block diagram outlining an aspect showing a thermoplastic polymer powder feedstock and a conductive powder feedstock and a system 40. As shown in FIG. 3A, in system 40, a thermoplastic polymer powder feedstock 42a, and a conductive powder feedstock 42b are directed to a mixing vessel (not shown). The predetermined amounts of the first and second thermoplastic polymer feedstocks 42a, 42b are delivered via first and second thermoplastic polymer powder feedstock feedlines 41a and 41b, respectively, and mixed together to form a conductive thermoplastic polymer powder feedstock mixture 47. An amount of the conductive thermoplastic polymer powder feedstock mixture 47 is directed via conductive thermoplastic polymer powder feedstock mixture feedline 48 to high-velocity sprayer 44. Feedline 48 as shown in FIG. 3A is in communication with conductive thermoplastic feedstock mixture 47 and the high-velocity sprayer 44. Predetermined amounts of conductive thermoplastic polymer feedstock mixture 47 can be directed to the high-velocity sprayer 44 by any desirable means, including automated means regulated by a controller (not shown) and subject to, for example, software and hardware known to control, for example, feedstock flow rates from a supply to a sprayer, etc. The high-velocity sprayer 44 can be a thermal sprayer or a cold sprayer. As shown in FIG. 3A, the conductive thermoplastic polymer powder feedstock is converted by the high-velocity sprayer 44 into a conductive thermoplastic polymer coating 46a deposited onto substrate 46. While the high-velocity sprayer 44 can be operated manually, FIG. 3A shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 40 to control one or more aspects of system 40.

Figure 3B:
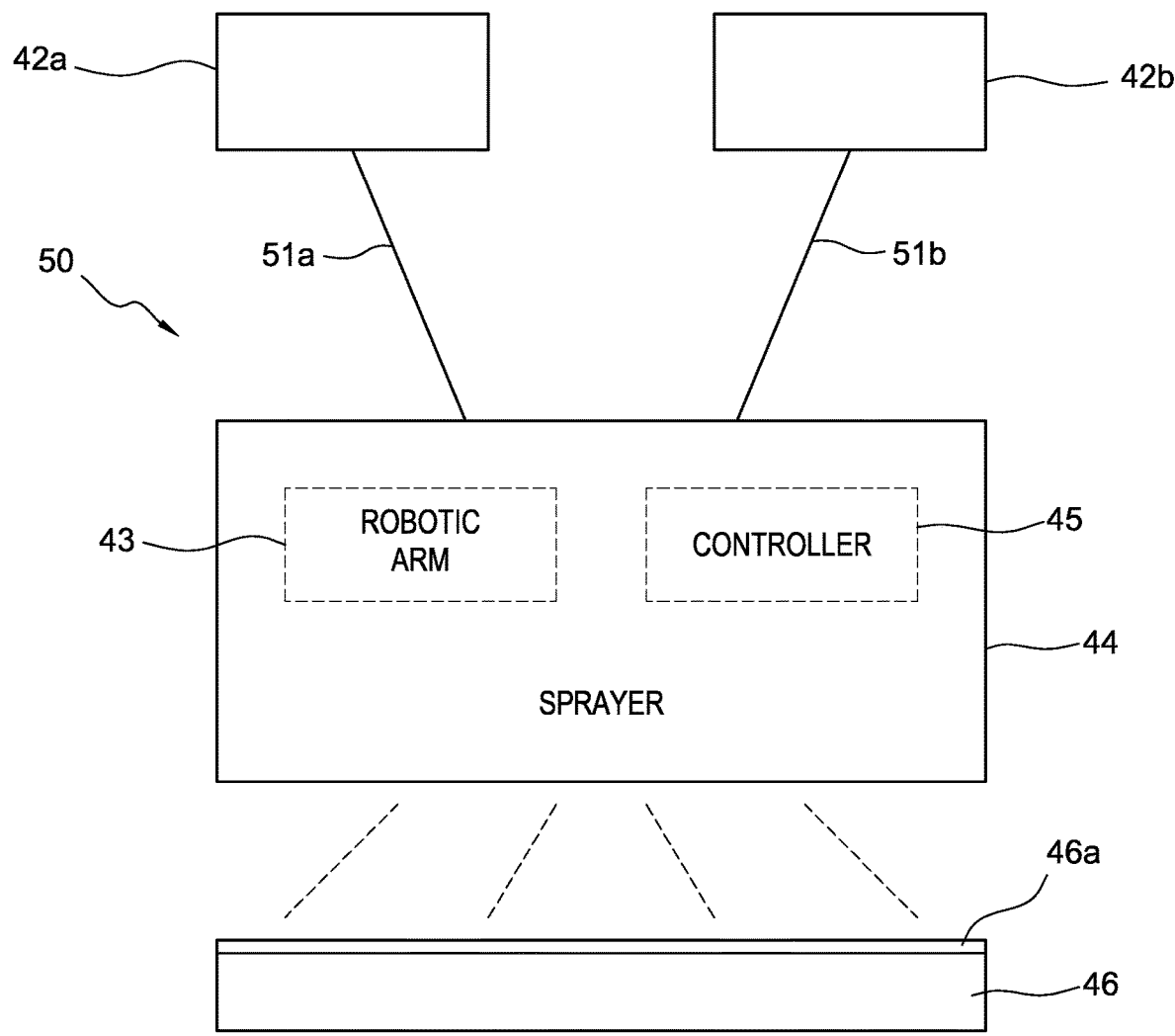

FIG. 3B shows a block diagram outlining an aspect showing a conductive thermoplastic polymer powder and a system 50 similar to system 40 shown in FIG. 3A, except that as shown in FIG. 3B, system 50 comprises a thermoplastic polymer powder feedstock feedline 51a in communication with a thermoplastic polymer powder feedstock 42a and a high-velocity sprayer 44. Conductive powder feedstock feedline 51b is shown in communication with the conductive powder feedstock 42b and the high-velocity sprayer 44. That is, as shown in FIG. 3B, an amount of the thermoplastic polymer powder feedstock 42a is not mixed with an amount of the conductive powder feedstock 42b to form a conductive thermoplastic polymer feedstock mixture. Instead, according to an aspect shown in FIG. 3B as system 50, a predetermined amount of the thermoplastic polymer powder feedstock 42a is directed to high-velocity sprayer 44 via thermoplastic polymer powder feedstock feedline 51a. Similarly, a predetermined amount of the conductive powder feedstock 42b is directed to the high-velocity sprayer 24 via conductive powder feedstock feedline 51b. While the high-velocity sprayer 44 can be operated manually, FIG. 3B shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46*a* onto a substrate 46. Optionally, additional controllers (not shown) can be integrated into system 50 to control one or more aspects of system 50.

Figure 4A:
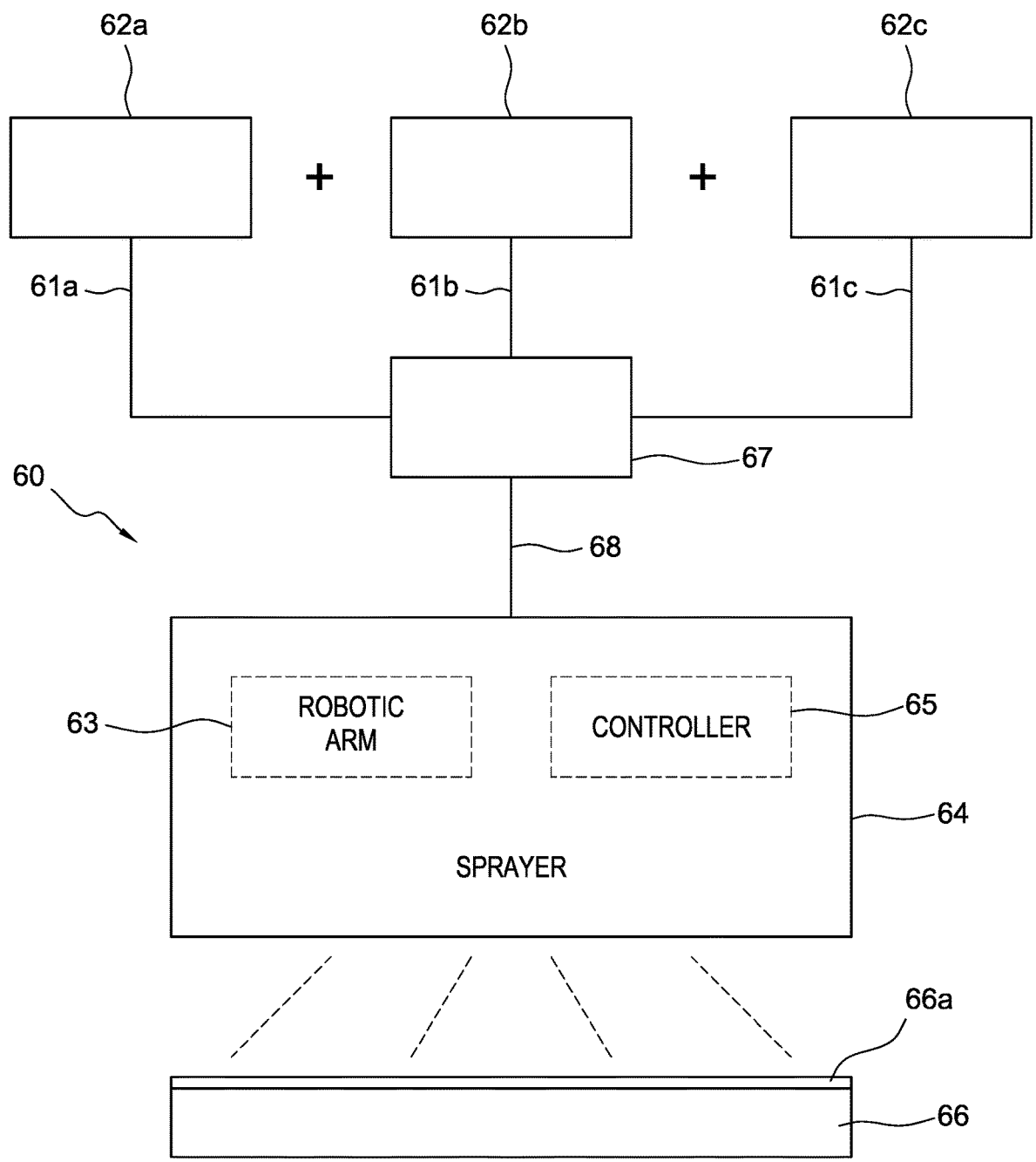

FIG. 4A shows a block diagram outlining an aspect showing a conductive thermoplastic polymer powder feedstock and a system 60 including mixing first and second thermoplastic polymer powder feedstocks with a conductive powder feedstock to form a conductive thermoplastic powder feedstock mixture, and then directing an amount of the conductive thermoplastic powder feedstock mixture to a high-velocity sprayer and depositing a conductive thermoplastic polymer coating onto a substrate surface. As shown in FIG. 4A, in system 60, an amount of a first thermoplastic polymer powder feedstock 62*a*, an amount of a second thermoplastic polymer powder feedstock 62*b*, and an amount of a conductive powder feedstock 62*c* are directed to a mixing vessel (not shown) and are mixed together to form a conductive thermoplastic polymer powder feedstock mixture 67. A desired amount of the conductive thermoplastic polymer powder feedstock mixture 67 is directed via feedstock mixture feedline 68 to high-velocity sprayer 64. Feedstock mixture feedline 68, as shown in FIG. 4A, is in communication with conductive thermoplastic polymer powder feedstock mixture 67 and the high-velocity sprayer 64. Predetermined amounts of: 1) the first thermoplastic polymer powder feedstock 62*a;* 2) the second thermoplastic polymer powder feedstock 62*b*; and 3) the conductive powder feedstock 62*c* are directed to the conductive thermoplastic polymer powder feedstock mixture 67 via first thermoplastic polymer powder feedstock feedline 61*a*, second thermoplastic polymer powder feedstock feedline 61*b* and conductive polymer powder feedstock feedline 61*c*, respectively, by any desirable means. Predetermined amounts of conductive thermoplastic polymer feedstock mixture 67 are directed to the high-velocity sprayer 64 by any desirable means, including, for example, an automated means regulated by a controller (not shown) and subject to, for example, software and hardware known to control, for example, feedstock flow rates to a sprayer, etc. The high-velocity sprayer 64 can be a thermal sprayer or a cold sprayer. As shown in FIG. 4A, the conductive thermoplastic polymer powder feedstock mixture 67 is converted by the high-velocity sprayer 44 into a conductive thermoplastic polymer coating 66*a* deposited onto substrate 46. While the high-velocity sprayer 64 can be operated manually, FIG. 4A shows an optional robotic arm 63 (or "robot") that can be in communication with a controller 65. Controller 65 can further optionally be in communication with remote or integrated software or hardware, as desired, to control movement of the robotic arm 63 as well as control flow rates and amounts of deposited conductive thermoplastic polymer coating 66*a* onto a substrate 66. Optionally, additional controllers (not shown) can be integrated into system 60 to control one or more aspects of system 60.

Figure 4B:
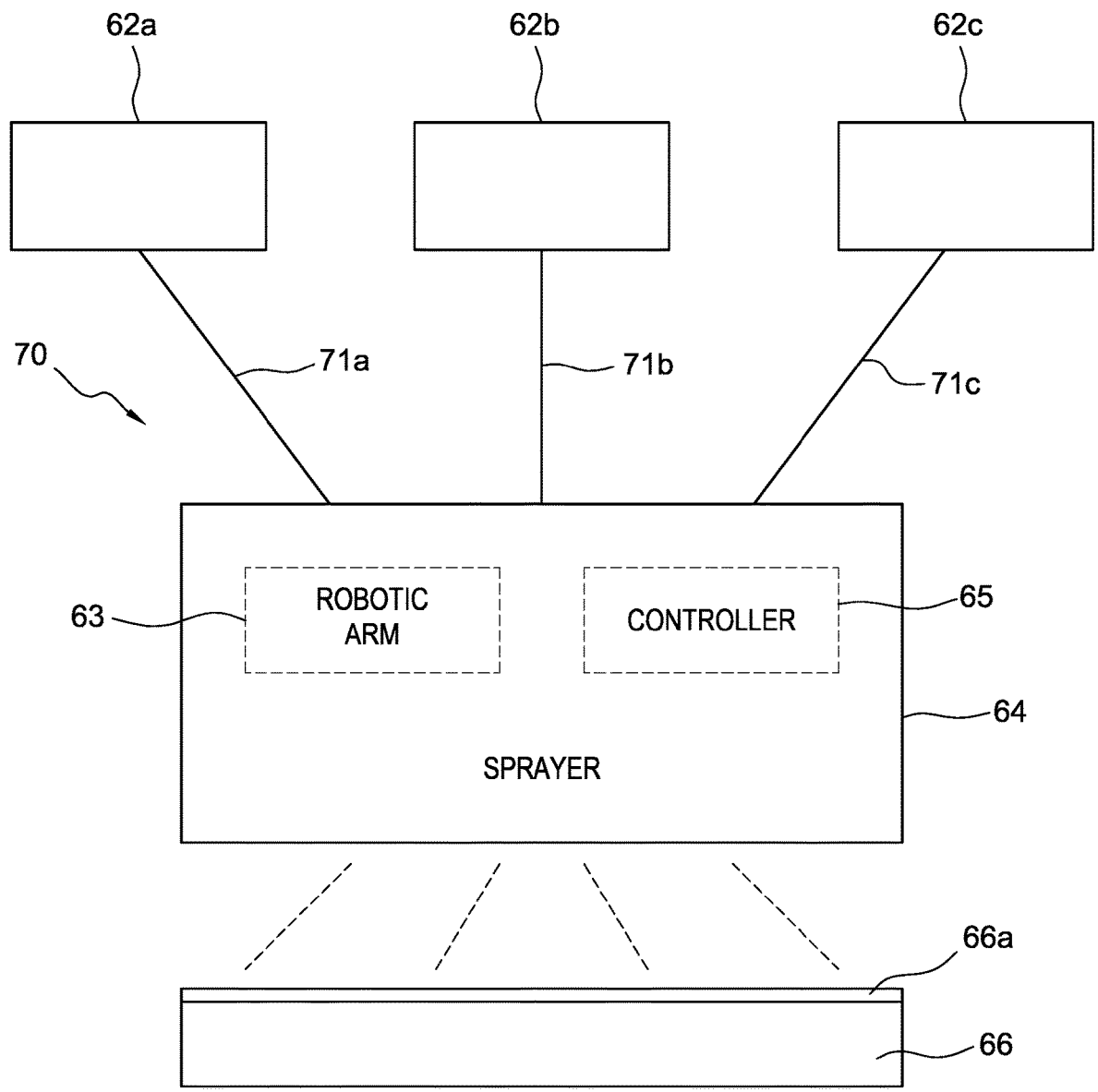

FIG. 4B shows a block diagram outlining an aspect showing a conductive thermoplastic polymer powder and a system 70 similar to system 60 shown in FIG. 4A, except that as shown in FIG. 4B, system 70 comprises: 1) a first thermoplastic polymer powder feedstock feedline 71*a* in communication with the first thermoplastic polymer powder feedstock 62*a* and the high-velocity sprayer 64; 2) a second thermoplastic polymer powder feedstock feedline 71*b* in communication with the first thermoplastic polymer powder feedstock 62*b* and the high-velocity sprayer 64; and 3) a conductive powder feedstock feedline 71*c* in communication with the conductive powder feedstock 62*c* and the high-velocity sprayer 64. That is, as shown in FIG. 4B, an amount of the first thermoplastic polymer powder feedstock 62*a*, and an amount of the second thermoplastic polymer powder feedstock 62*b* are not mixed with an amount of the conductive powder feedstock to form a conductive thermoplastic polymer feedstock mixture. Instead, according to system 70 shown in FIG. 4B, a predetermined amount of the first thermoplastic polymer powder feedstock 62*a* is directed to high-velocity sprayer 64 via first thermoplastic polymer powder feedstock feedline 71*a*. Similarly, a predetermined amount of the second thermoplastic polymer powder feedstock 62*b* is directed to high-velocity sprayer 64 via second thermoplastic polymer powder feedstock feedline 71*b*. Further, a predetermined amount of the conductive powder feedstock 62*c* is directed to the high-velocity sprayer 64 via conductive powder feedstock feedline 71*c*. While the high-velocity sprayer 64 can be operated manually, FIG. 4B shows an optional robotic arm 63 (or "robot") that can be in communication with a controller 65. Controller 65 can further optionally be in communication with remote or integrated software or hardware, as desired, to control movement of a robotic arm 63 as well as control flow rates and amounts of deposited conductive thermoplastic polymer coating 66*a* onto a substrate 66. Optionally, additional controllers (not shown) can be integrated into system 70 to control one or more aspects of system 70.

The robotic arm disclosed above is equivalently referred to herein as a "robot", such that any feature of the robot (in addition to the "arm") can control the relative movement of the high-velocity sprayer, and/or the robot can control the direction of spray emitted from the high-velocity sprayer (e.g., the robot controls the direction and change the direction of spray from the high-velocity sprayer while the sprayer itself remains in a substantially stationary position, etc.).

Figure 5:
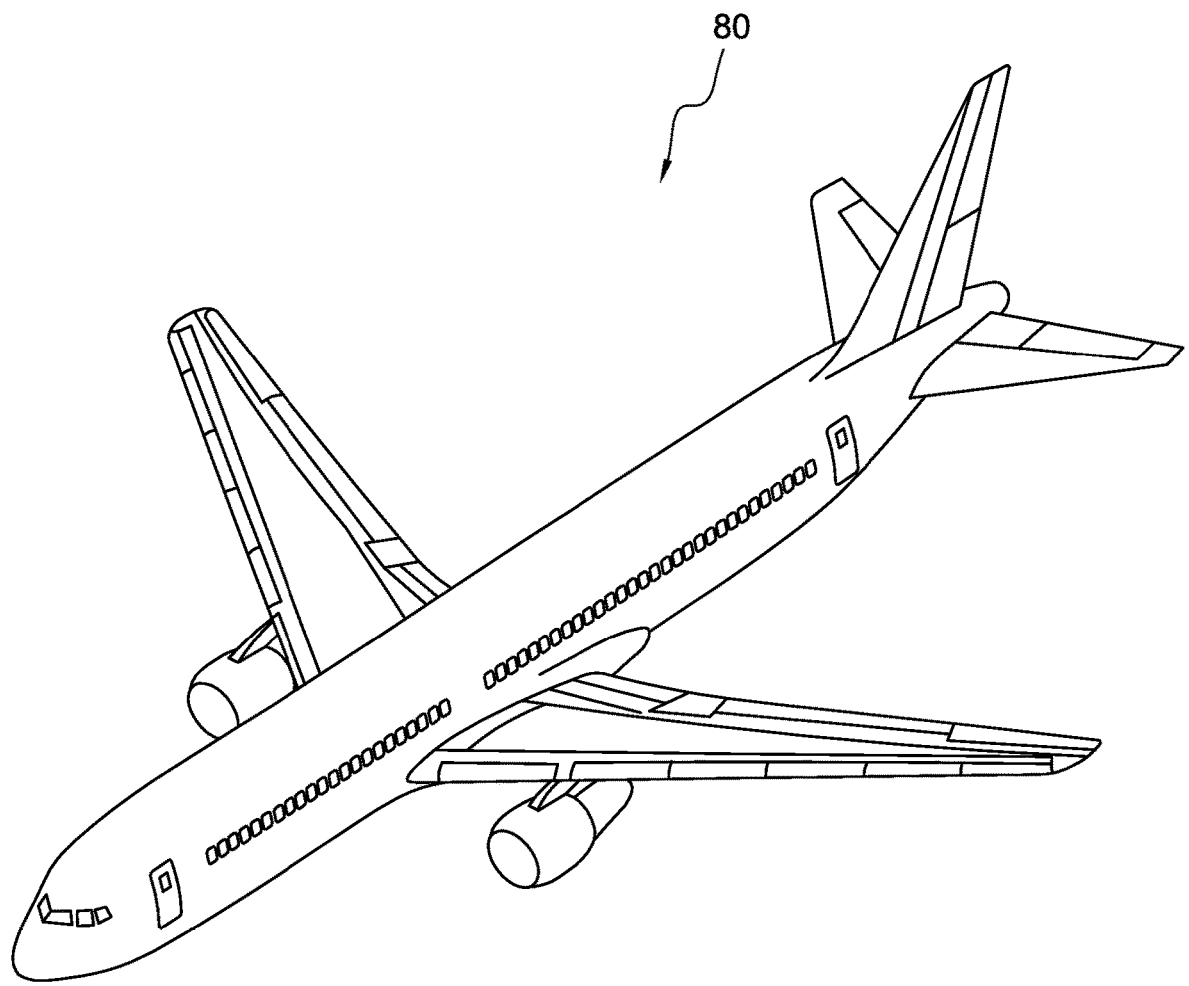

FIG. 5 is an illustration of an aircraft 80 having substrate surfaces and assemblies, sub-assemblies and components having substrate surfaces that can be advantageously coated by the thermoplastic polymer coatings and/or the conductive thermoplastic coatings set forth herein. It is further understood that, the coatings described herein can be advantageously coated onto substrates occurring on components, assemblies and sub-assemblies incorporated in further types of manned and unmanned aircraft, terrestrial vehicles, sub-surface and surface marine (e.g., water borne) vehicles, manned and unmanned satellites, etc.

Figure 6:
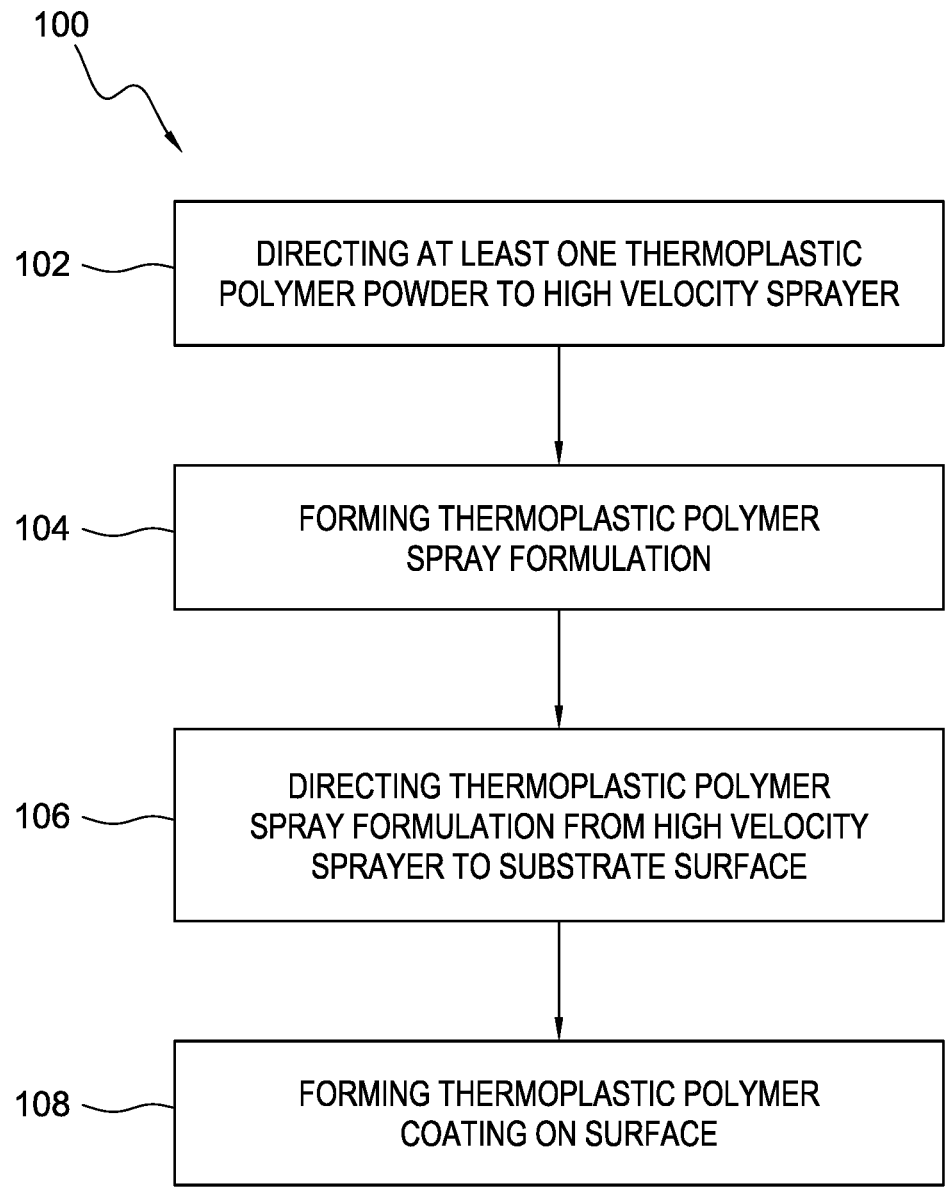
Figure 7:
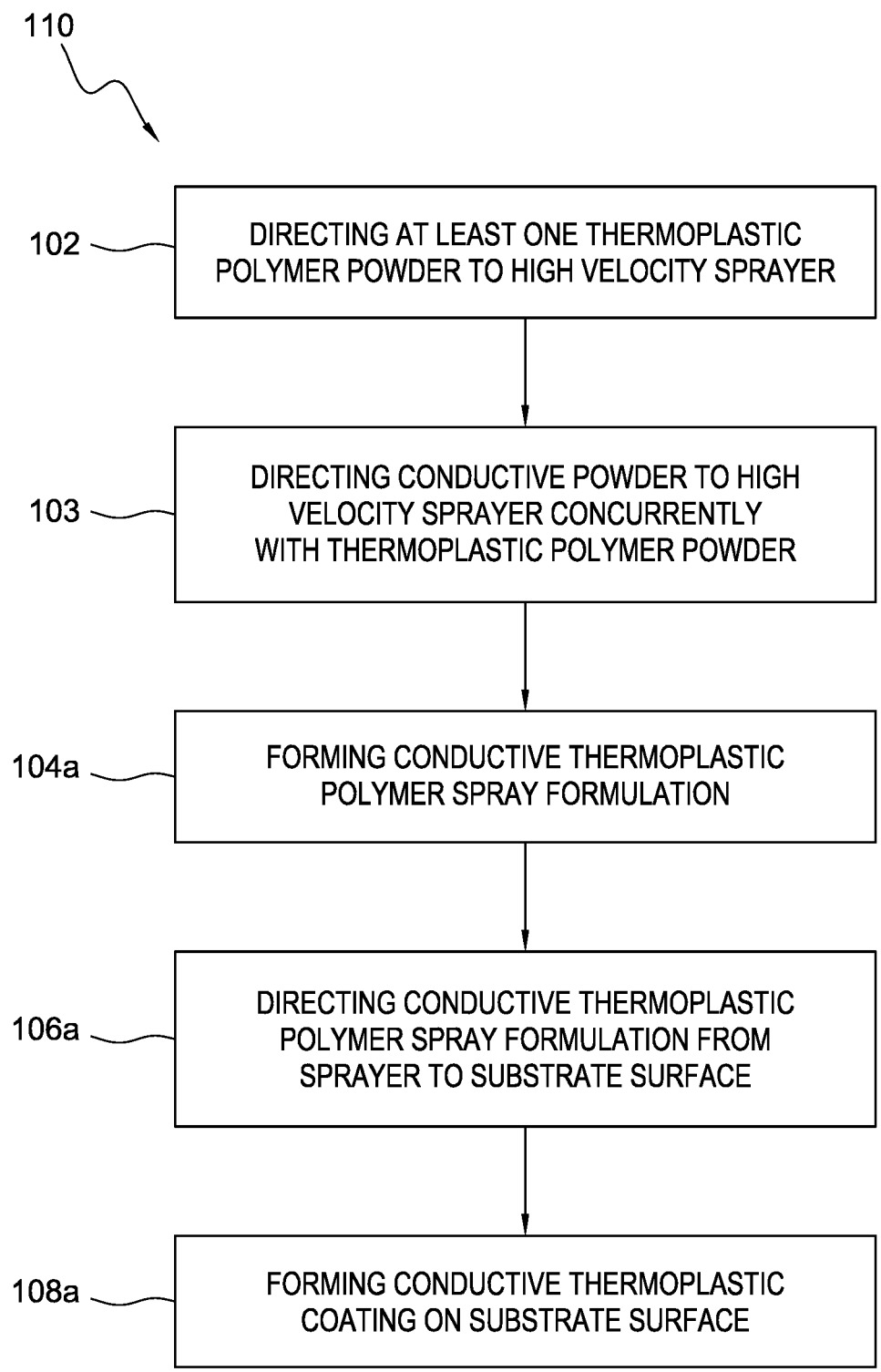
Figure 8:
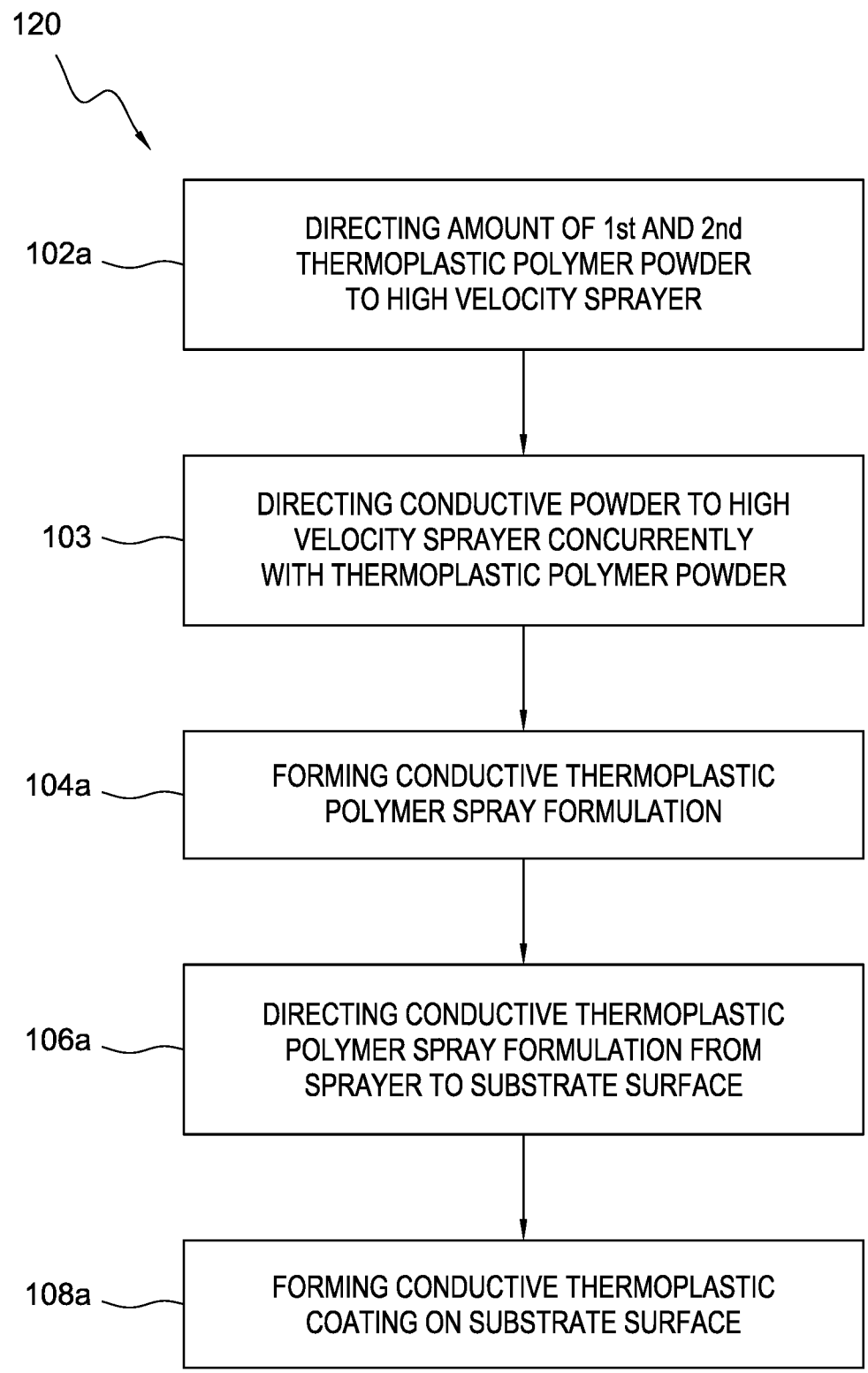

FIGS. 6-8 are flowcharts outlining aspects of the present disclosure. FIG. 6 outlines a method 100 comprising directing 102 at least one thermoplastic polymer powder to a high-velocity sprayer, followed by forming 104 a thermoplastic polymer spray formulation at or near the high-velocity sprayer. The method outlined in FIG. 6 further comprises directing 106 the thermoplastic spray formulation from the high-velocity sprayer to a substrate having a substrate surface, and forming 108 a thermoplastic polymer coating on the substrate surface. The method outlined in FIG. 6 is understood to at least relate to the systems shown in FIGS. 1, 2A and 2B.

FIG. 7 outlines a method 100 comprising directing 102 an amount of at least one thermoplastic polymer powder to a high-velocity sprayer, followed by directing 103 an amount of conductive powder to the high-velocity sprayer concurrently with thermoplastic polymer powder and forming 104*a* a conductive thermoplastic polymer spray formulation at or near the high velocity sprayer. The method further comprises directing 106a the conductive thermoplastic polymer spray formulation from the sprayer to a substrate surface, and forming 108a a conductive thermoplastic coating on the substrate surface. The method outlined in FIG. 7 is understood to at least relate to the systems shown in FIGS. 3A, 3B, 4A and 4B.

FIG. 8 outlines a method 120 comprising directing 102a an amount of a first thermoplastic polymer powder and an amount of a second thermoplastic polymer powder and an amount of a conductive powder to a high-velocity sprayer, followed by forming 104a a conductive thermoplastic polymer spray formulation. The method further comprises directing 106a the conductive thermoplastic polymer formulation from the sprayer to a substrate surface, and forming 108a a conductive thermoplastic coating on the substrate surface. The method outlined in FIG. 8 is understood to at least relate to the systems shown in FIGS. 4A and 4B.

Example 1

At room temperature, an amount of 95 g of PEEK powder (KetaSpire® KT820, low melt flow; KetaSpire® KT-880, high melt flow—Spire Ultra Polymers, Solvay, Brussels Belgium) having a median particle size of about 30 μm was mixed with an amount of 5 g of conductive titanium powder (TS1374—Titanium Powder—Stanford Advanced Materials, Irvine, Calif.) having a nominal particle diameter of about 90 μm. The two powders were mixed using a Mazerustar Mixer (Medisca, Las Vegas, Nev.), to form a thorough conductive thermoplastic polymer powder mixture produced by the combining of the two powders (representing 100% by weight). The mixture was loaded as a feedstock into a reservoir of a thermal sprayer (ASC PG-550 (Alamo Supply Co., Lt., Houston, Tex.) Three formulations having a varied amount (% by volume) of titanium in the total powder mixture were prepared: 1) 1% titanium powder by volume; 2) 6% titanium by volume; and 3) 9% titanium by volume.

Example 2

The thermal sprayer was set to a flow rate equal to approximately 1 to 50 g/sec., and amounts of the three feedstock mixtures (conductive thermoplastic polymer powder mixtures) prepared in Example 1 were each directed from the reservoir into the thermal sprayer and to the heated spray head. Each feedstock achieved a phase change, from solid to a flowing, heated sprayable liquid, and was then sprayed as a particulate spray and directed by and from the thermal sprayer to a substrate surface comprising a lap joint interface of an aluminum panel (2000, 6000 and 7000 series aluminum) located proximate to a carbon fiber reinforced plastic composite panel. The substrate surface was solvent cleaned (acetone wipe) and dried completely. The head of the thermal sprayer was located at a distance of about 24" from the substrate surface. The thermal sprayer was moved manually to deposit a visually uniform coverage of the substrate surface. The substrate surface temperature was monitored with a thermostat.

Example 3

The conductive thermoplastic coatings prepared and deposited according to the processes described in Examples 1 and 2 were allowed to cool on the substrate surface for not more than 5 minutes. The conductive thermoplastic coating had measured resistivity values as set forth in Table 1 for three Samples (#1, #2, and #3) having 1%, 6% and 9% by volume of titanium in the conductive thermoplastic polymer powder formulations prepared. Adjusting the amount/concentration/ratio of conductive titanium powder in the thermoplastic polymer (PEEK/Ti) powder feedstock mixture resulted in a measured variance in the resistivity of the conductive thermoplastic polymer coating as noted in Table 1.

TABLE 1

| PEEK/Titanium Powder | | |
|---|---|---|
| PEEK Powder (% by total volume of PEEK/Ti Mixture) | Ti Powder (% by total volume of PEEK/Ti Mixture) | Resistivity (ohm-m) |
| 99% | 1% | $1 \times 10e^{10}$ |
| 94% | 6% | $1 \times 10e^{8}$ |
| 91% | 9% | $1 \times 10e^{7}$ |

Additional amounts of thermoplastic polymer powders were mixed with varying amounts of conductive powders to produce feedstock mixtures the thermal spraying conducted as described above.

Further aspects of the present disclosure contemplate structural and other components for vehicles and objects including, without limitation, aircraft structures (e.g., spars, ribs, stringers, etc.), with such components finding utility at least in connection with vehicle fuel tanks, fuel tank systems fuel tank assemblies, fuel tank sub-assemblies, etc. Such vehicles and objects include, without limitation, a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned hovercraft, an unmanned hovercraft, a manned surface water borne vehicle, an unmanned surface water borne vehicle, a manned sub-surface water borne vehicle, an unmanned sub-surface water borne vehicle, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for delivering a thermoplastic polymer coating material to a substrate surface, said method comprising:
    directing an amount of at least one tunable thermoplastic polymer powder feedstock to a high-velocity cold sprayer to form a tunable thermoplastic polymer spray formulation, said tunable thermoplastic polymer powder feedstock selected from the group consisting of: nylon, polyether ether ketone, polyether ketone, polyamide, polyphenylsulfide, polyphenylsulfone, polysulfone, polyetherimide, and combinations thereof;
    directing the thermoplastic polymer spray formulation from the high-velocity cold sprayer to a substrate surface; and
    forming a tuned thermoplastic polymer coated substrate surface.

2. The method of claim 1, concurrently with the step of directing an amount of at least one tunable thermoplastic polymer powder feedstock to the high-velocity cold sprayer further comprising:

directing an amount of a conductive powder feedstock to the high-velocity cold sprayer to form a tunable conductive thermoplastic polymer spray formulation, said conductive powder feedstock selected from the group consisting of: titanium, nickel alloy, copper, carbon black, graphene powder, carbon nanotubes, and combinations thereof;

directing the tunable conductive thermoplastic polymer spray formulation from the high-velocity cold sprayer to the substrate surface to form a conductive thermoplastic polymer coating material; and forming a conductive thermoplastic polymer coated substrate surface, said conductive thermoplastic polymer coating material having a resistivity ranging from about $1 \times 10e^5$ to about $1 \times 10e^8$ ohm-m.

3. The method of claim 1, before the step of directing an amount of at least one tunable thermoplastic polymer powder feedstock to the high-velocity cold sprayer to form a tunable thermoplastic polymer spray formulation, the method further comprising:

mixing the at least one tunable thermoplastic polymer powder feedstock with a conductive powder feedstock to form a tunable conductive thermoplastic polymer feedstock mixture; and directing an amount of the tunable conductive thermoplastic polymer feedstock mixture to the high-velocity cold sprayer.

4. The method of claim 1, further comprising:

directing an amount of a first thermoplastic polymer powder feedstock to the high-velocity cold sprayer, the first thermoplastic polymer powder feedstock selected from the group consisting of: nylon, polyetheretherketone, polyetherketoneketone, polyamide, polyphenylsulfide, polyphenylsulfone, polysulfone, polyetherimide, and combinations thereof;

directing an amount of a second thermoplastic polymer powder feedstock to the high-velocity cold sprayer, the second thermoplastic polymer powder feedstock selected from the group consisting of: nylon, polyetheretherketone, polyetherketoneketone, polyamide, polyphenylsulfide, polyphenylsulfone, polysulfone, polyetherimide, and combinations thereof; and wherein the first thermoplastic polymer powder feedstock is different from the second thermoplastic polymer powder feedstock.

5. The method of claim 4, concurrently with the steps of directing an amount of a first thermoplastic polymer powder feedstock to the high-velocity cold sprayer, and directing an amount of a second thermoplastic polymer powder feedstock to the high-velocity cold sprayer directing further comprising:

directing an amount of a conductive powder feedstock to the high-velocity cold sprayer to form a tunable conductive thermoplastic polymer spray formulation, said conductive powder feedstock selected from the group consisting of: titanium, nickel alloy, copper, carbon black, graphene powder, carbon nanotubes, and combinations thereof.

6. The method of claim 5, further comprising:

directing the conductive powder feedstock to the high-velocity cold sprayer at an amount ranging from about 1% to about 9% by volume of the tunable conductive thermoplastic polymer spray formulation.

7. The method of claim 5 further comprising:

directing the tunable conductive thermoplastic polymer spray formulation from the high-velocity cold sprayer to a substrate surface; and forming a conductive thermoplastic polymer coating on the substrate surface, said conductive thermoplastic polymer coating having a resistivity ranging from about $1 \times 10e^5$ to about $1 \times 10e^8$ ohm-m.

8. The method of claim 5, further comprising:

varying comparative amounts of the at least one thermoplastic polymer powder and the conductive powder to form a tunable conductive thermoplastic polymer coating on the substrate surface, said tunable conductive thermoplastic polymer coating having a predetermined resistivity ranging from about $1 \times 10e^5$ to about $1 \times 10e^8$ ohm-m.

9. The method of claim 4, before the steps of directing a first thermoplastic polymer powder feedstock to the high-velocity cold sprayer, and directing an amount of a second thermoplastic polymer powder feedstock to the high-velocity cold sprayer directing further comprising:

mixing the first thermoplastic polymer powder feedstock and the second thermoplastic polymer powder feedstock with a conductive powder feedstock to form a tunable conductive thermoplastic polymer feedstock mixture; and directing an amount of the tunable conductive thermoplastic polymer feedstock mixture to the high-velocity cold sprayer to form a tunable conductive thermoplastic polymer spray formulation.

\* \* \* \* \*